United States Patent
Noda et al.

[11] Patent Number: 5,884,473
[45] Date of Patent: Mar. 23, 1999

[54] SYSTEM FOR EXHAUST GAS PURIFICATION AND METHOD FOR EXHAUST GAS PURIFICATION USING SAID SYSTEM

[75] Inventors: Naomi Noda, Ichinomiya; Yukinari Shibagaki, Kounan; Hiroshige Mizuno, Tajimi; Akira Takahashi, Nagoya, all of Japan

[73] Assignee: NGK Insulators, Ltd., Japan

[21] Appl. No.: 668,208

[22] Filed: Jun. 19, 1996

[30] Foreign Application Priority Data

Jun. 23, 1995 [JP] Japan ................................. 7-158235

[51] Int. Cl.$^6$ ............................ F01N 3/28; F01N 3/10; B01J 8/02

[52] U.S. Cl. ......................... 60/274; 60/301; 422/177; 423/213.2

[58] Field of Search ............................. 60/274, 297, 299, 60/301, 311; 422/170, 171, 177, 178, 180; 423/212, 213.2, 213.5, 213.7, 403; 502/325, 326, 334

[56] References Cited

U.S. PATENT DOCUMENTS

| | | | |
|---|---|---|---|
| 4,863,893 | 9/1989 | Farrauto et al. | 423/403 |
| 4,902,487 | 2/1990 | Cooper et al. | 423/215.5 |
| 4,985,210 | 1/1991 | Minami | 60/297 |
| 5,139,994 | 8/1992 | Chattha et al. | 423/213.5 |
| 5,459,119 | 10/1995 | Abe et al. | 423/213.5 |
| 5,662,869 | 9/1997 | Abe et al. | 60/297 |
| 5,687,565 | 11/1997 | Modica et al. | 60/297 |

FOREIGN PATENT DOCUMENTS

| | | |
|---|---|---|
| 0 485 179 | 5/1992 | European Pat. Off. . |
| 0 639 699 | 2/1995 | European Pat. Off. . |
| 0 640 381 | 3/1995 | European Pat. Off. . |
| 0 666 103 | 8/1995 | European Pat. Off. . |
| 0 671 208 | 9/1995 | European Pat. Off. . |
| WO 93/07363 | 4/1993 | WIPO . |
| WO 95/09047 | 6/1995 | WIPO . |

OTHER PUBLICATIONS

Catalysis Today: "Development of Automotive Palladium Three-Way Catalysts," by Sekiba et al., 1994, pp. 113–126.

Primary Examiner—Willis R. Wolfe
Attorney, Agent, or Firm—Parkhurst & Wendel, L.L.P.

[57] ABSTRACT

A system for exhaust gas purification disposed in the exhaust pipe of an internal combustion engine, includes followings (i) a catalyst giving an excellent light-off performance at low temperatures, including a carrier and a catalyst layer supported thereon, the catalyst layer including a precious metal and a substance having an electron donatability and/or a nitrogen dioxide absorbability and releasability, and (ii) an adsorbent comprising a carrier and an adsorbent layer having a hydrocarbon adsorbability, supported on the carrier. This system for exhaust gas purification can effectively purify the harmful substances contained in the exhaust gases discharged from internal combustion engines of automobiles, etc., particularly the hydrocarbons discharged in a large amount from a gasoline engine during cold start.

81 Claims, 20 Drawing Sheets

F I G. 10
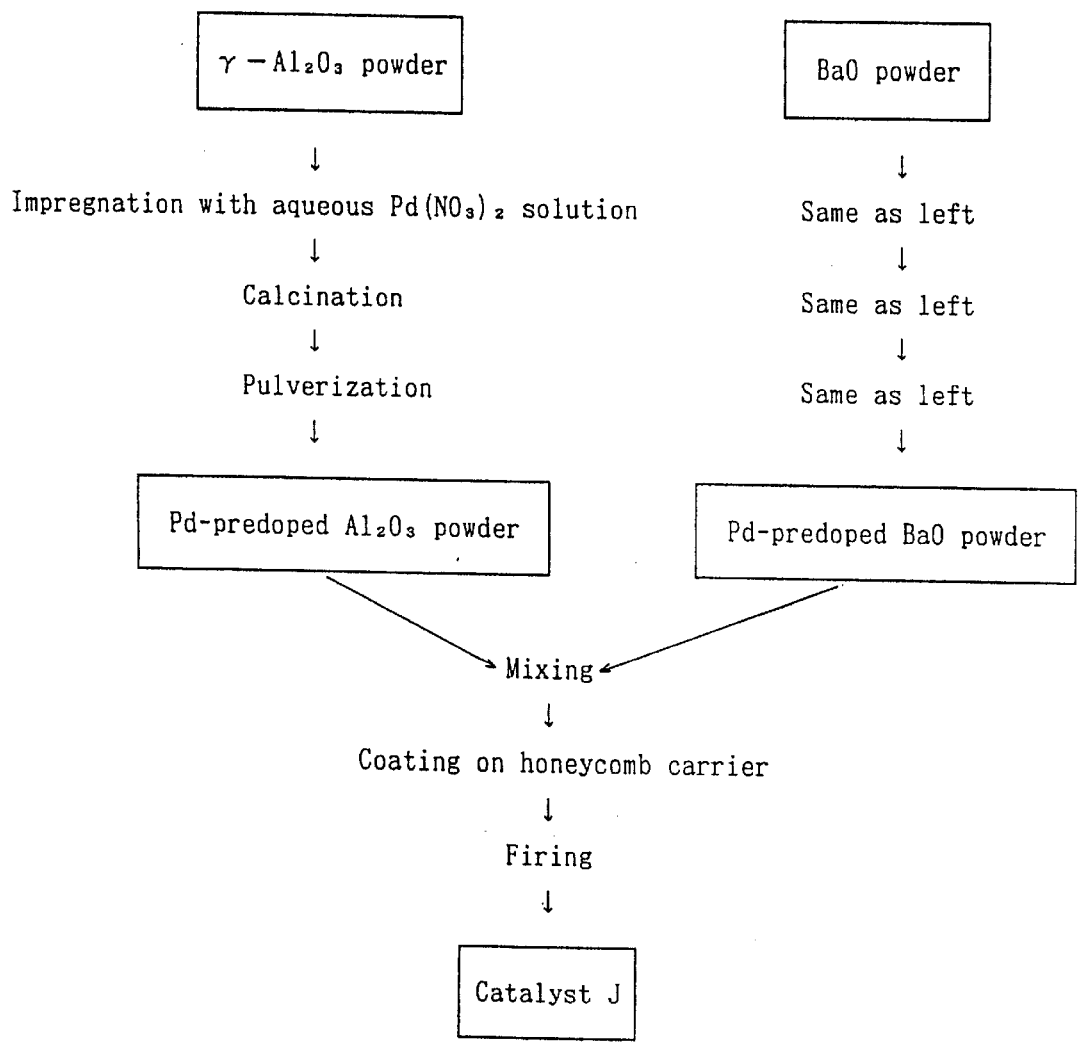

SYSTEM FOR EXHAUST GAS PURIFICATION AND METHOD FOR EXHAUST GAS PURIFICATION USING SAID SYSTEM

BACKGROUND OF THE INVENTION (1). Field of the Invention

The present invention relates to a system for exhaust gas purification, employed for the purification of harmful substances such as hydrocarbons (HC), nitrogen oxides ($NO_x$), carbon monoxide (CO) and the like, present in the exhaust gases discharged from internal combustion engines of automobiles, etc., as well as to a method for exhaust gas purification using the above system.

(2). Description of the Prior Art

Various catalyst techniques have heretofore been proposed for the purification of the exhaust gases discharged from internal combustion engines of automobiles, etc.

For example, in WO 93/07363 is disclosed an apparatus for exhaust gas purification, which is an $NO_x$ absorbent disposed in the flow path of exhaust gas so that the absorbent can absorb $NO_x$ when the air fuel ratio of exhaust gas is high (fuel is lean) and can release $NO_x$ when the oxygen concentration exhaust gas is low.

Also in U.S. Pat. No. 4,902,487 is disclosed a technique of collecting the particulates contained in diesel engine exhaust gas by the use of a filter and burning the particulates at low temperatures of about 225°–300° C. by using $NO_x$ as an oxidizing agent.

Further in Catalysis Today, 22 (1994), 113–126, it is disclosed that when a so-called "Pd only catalyst" is used with a basis element and/or a transition metal oxide added thereto, catalyst poisoning by HC is reduced by the electron-donating effect of the added element and/or oxide and, as a result, an improved $NO_x$ purification ability is obtained.

In recent years, it has been one of the major technical tasks to effectively purify the combustible components (e.g. HC, CO and $H_2$), particularly HC present in the exhaust gas discharged from gasoline engine during its cold start. During the cold start, engines are operated generally at a low air fuel ratio (fuel is rich) and a large amount of HC is contained in the exhaust gas; meanwhile, the catalyst provided in the exhaust gas system does not yet reach the activation temperature and shows a low purification ability; consequently, a large proportion of the HC tends to be released into the atmosphere without being purified. Therefore, there is needed a technique capable of effectively purifying the HC present in the exhaust gas discharged during cold start.

When the above-mentioned conventional techniques are looked at from the above standpoint, the apparatus disclosed in WO 93/07363 aims at the purification of the $NO_x$ discharged from lean burn engine and diesel engine during steady-state operation and does not aim at the purification of the HC discharged during cold start; further, the apparatus includes no idea of effectively utilizing the reaction heat generated. Furthermore, in this apparatus, the air fuel ratio of exhaust gas is intentionally switched from a high side (fuel is lean) to a stoichiometric air fuel ratio or a low side (fuel is rich) before the $NO_x$ absorbent reaches its saturation, whereby the $NO_x$ absorbed by the absorbent is released and reduction and purification are allowed to take place. The switch of air fuel ratio from high side(lean fuel) to stoichiometric ratio or low side (rich fuel) is repeated and the apparatus is used at high temperatures for a long period of time.

The technique disclosed in U.S. Pat. No. 4,902,487 is for the treatment of the particulates contained in diesel engine exhaust gas and, as is so with the apparatus mentioned above, does not aim at the purification of the exhaust gas discharged from gasoline engine during cold start. Further in this technique, while the $NO_2$ used for burning particulates is generated from the NO contained in exhaust gas, by the catalysis of the Pt used, no idea of using occluded or concentrated $NO_2$ is employed and therefore it is difficult to supply $NO_2$ of an amount sufficient to treat the diesel particulates. Furthermore, since the particulates contained in diesel engine exhaust gas are solid particulates having an average particle diameter of about 0.2 $\mu$m, the particulates, unlike the combustible components (e.g. HC) contained in gasoline engine exhaust gas, only accumulate on a precious metal (a catalyst) and are not adsorbed thereby; consequently, the probability of diesel particulates to react with $NO_2$ on the precious metal is considered to be low.

With respect to the technique disclosed in Catalysis Today, 22 (1994), 113–126, even if the electron-donating effect of the added element and/or oxide can enhance the $NO_x$ purification ability of the "Pd only catalyst", i.e. the $NO_x$ light-off performance, said effect alone is unable to effectively purify the HC generated in a large amount during cold start.

In order to increase the purification ability of HC generated during cold start, there was proposed a system for exhaust gas purification disposed in an exhaust gas pipe, comprising (a) a catalyst and (b) an adsorbent (e.g. zeolite) having HC adsorbability, provided upstream of the catalyst. This system aims at temporary adsorption of HC on the adsorbent until the downstream side catalyst reaches its light-off temperature; however, in actuality, the HC adsorbed on the adsorbent begins to be desorbed from the adsorbent when the adsorbent reaches about 150° C., and the downstream side catalyst does not light-off until it reaches about 300°–350° C. Thus, even when the adsorbent is provided upstream of the catalyst, as long as the catalyst is a conventional catalyst having a high light-off temperature, the difference between the initial temperature of HC desorption from adsorbent and the light-off temperature of catalyst is too large, making impossible the effective purification of HC.

OBJECT AND SUMMARY OF THE INVENTION

In order to effectively conduct the purification of the HC contained in exhaust gas during cold start (the purification has been insufficient with conventional techniques), the present invention is intended to provide a system for exhaust gas purification which is a combination of (a) a catalyst composition or a catalyst both giving an excellent light-off performance at low temperatures and (b) an adsorbent or an adsorbent-catalyst both having a HC adsorbability; and a method for exhaust gas purification using the system.

According to the present invention, there is provided a system for exhaust gas purification disposed in the exhaust pipe of internal combustion engine, which comprises the followings (A) and (B):

(A) a catalyst composition giving an excellent light-off performance at low temperatures, which comprises a precious metal and a substance having an electron donatability and/or a nitrogen dioxide absorbability and releasability, and (B) an adsorbent having a hydrocarbon adsorbability. (This system is hereinafter referred to as the first invention.)

According tho the present invention, there is also provided a system for exhaust gas purification disposed in the exhaust pipe of internal combustion engine, which comprises the followings (C) and (D):

(C) a catalyst giving an excellent light-off performance at low temperatures, comprising a carrier and a catalyst layer supported thereon, the catalyst layer comprising a precious metal and a substance having an electron donatability and/or a nitrogen dioxide absorbability and releasability, and (D) an adsorbent comprising a carrier and an adsorbent layer having a hydrocarbon adsorbability, supported on the carrier.

(This system is hereinafter referred to as the second invention.)

According to the present invention, there is further provided a system for exhaust gas purification disposed in the exhaust pipe of internal combustion engine, which comprises the followings (E) and (F):

(E) a catalyst giving an excellent light-off performance at low temperatures, comprising a carrier and a catalyst layer supported thereon, the catalyst layer comprising a precious metal and a substance having an electron donatability and/or a nitrogen dioxide absorbability and releasability, and (F) an adsorbent-catalyst comprising a monolithic carrier, an adsorbent layer having a hydrocarbon adsorbability and a catalyst layer having a three-way catalytic activity or an oxidizing ability, the adsorbent layer and the catalyst layer being separately supported on the monolithic carrier in all or part of the cross sections of the adsorbent-catalyst perpendicular to the flow direction of exhaust gas.

(This system is hereinafter referred to as the third invention.)

According to the present invention, there is furthermore provided a method for exhaust gas purification using one of the above systems for exhaust gas purification, which comprises adding an oxidizing gas to an exhaust gas to be purified or controlling the amounts of air and fuel fed into engine so that the oxygen amount in exhaust gas is increased, for a certain length of time during engine cold start. (This method is hereinafter referred to as the fourth invention.)

BRIEF DESCRIPTION OF THE DRAWINGS

FIG. 10 is a schematic drawing showing the preparation steps of a catalyst used in the present system.

DETAILED DESCRIPTION OF THE INVENTION

Figure 1:
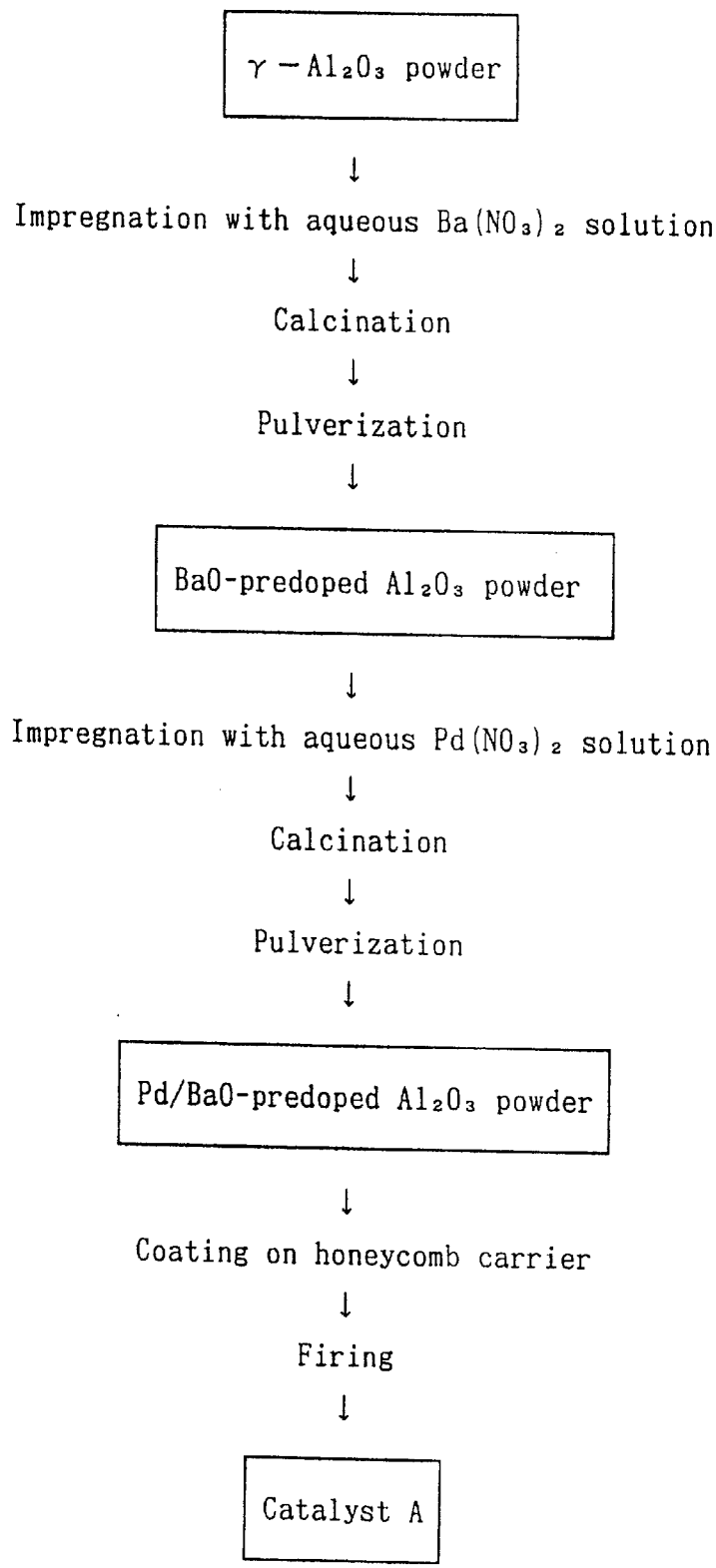
FIG. 1 is a schematic drawing showing the preparation steps of a catalyst used in the system for exhaust gas purification according to the present invention.

The present invention is hereinafter described in detail.

The system for exhaust gas purification, which is the first invention, is disposed in the exhaust pipe of internal combustion engine and comprises:

a catalyst composition giving an excellent light-off performance at low temperatures, which comprises a precious metal and a substance having an electron donatability and/or a nitrogen dioxide absorbability and releasability, and an adsorbent having a hydrocarbon adsorbability.

First, description is made on the catalyst composition giving an excellent light-off performance at low-temperatures (this catalyst composition is hereinafter referred to as "the catalyst composition of low-temperature light-off performance" or simply as "the catalyst composition").

The catalyst composition of low-temperature light-off performance comprises a precious metal and a substance having at least one of the following two functions:

(a) an electron donatability, and (b) a nitrogen dioxide ($NO_2$) absorbability and releasability.

The purification mechanism when the catalyst composition comprises a precious metal and a substance having an electron donatability, is described below.

In an exhaust pipe, when an exhaust gas comes into contact with a conventional catalyst comprising a carrier and a precious metal supported thereon, at low temperatures, the hydrocarbons (HC) and/or carbon monoxide (CO) contained in the exhaust gas are adsorbed on the surface of the precious metal, preventing the approach of oxygen ($O_2$) to the precious metal surface; as a result, the reaction of HC and/or CO with $O_2$ is prevented. As the exhaust gas temperature is elevated and the HC adsorbed on the precious metal surface begins to be desorbed, the reaction of HC and/or CO with $O_2$ starts.

When there is used, as in the present invention, a catalyst composition giving an excellent light-off performance at low temperatures, which comprises a precious metal and a substance having an electron donatability (an electron donor), electrons ($e^-$) are donated from the electron donor to the precious metal, decreasing the adsorbability of the precious metal for HC and/or CO; as a result, $O_2$ adsorption takes place easily at the precious metal surface portions where the electrons have been donated and the adsorbability for HC and/or CO has been reduced, and the reaction of HC and/or CO with $O_2$ beings at a temperature lower than the light-off temperature of an ordinary three-way catalyst containing no electron donor.

The purification mechanism when the catalyst composition of low-temperature light-off performance comprises a precious metal and a substance having a nitrogen dioxide absorbability and releasability (a nitrogen dioxide absorber), is described below.

$NO_2$, which is very active itself, can react with the combustible components contained in exhaust gas, at a temperature lower than the temperature when $O_2$ reacts with the combustible components. Therefore, by allowing the nitrogen dioxide absorber to absorb $NO_2$ so as to concentrate it and release it during cold start, the combustible components can be reacted with the released $NO_2$ on the precious metal at low temperatures, whereby part of the exhaust gas can be purified; further, the heat generated by the above reaction increases the temperature of the catalyst composition of low-temperature light-off performance, whereby an improved purification ability is obtained. The reaction heat also increases the temperature of the surroundings of the catalyst composition, particularly the section downstream of the catalyst composition in the flow path of exhaust gas; therefore, when another catalyst is disposed downstream of the catalyst composition, the light-off property of the catalyst can be enhanced.

Thus, when the catalyst composition of low-temperature light-off performance comprises a precious metal and a nitrogen dioxide absorber, the heat of the reaction between $NO_2$ and combustible components acts as a trigger of light-off and the overall purification ability of the catalyst composition is expressed quickly.

Incidentally, even if the amount of $NO_2$ is not sufficient for the amount of the combustible components generated during cold start, once the heat generated by the reaction between combustible components and $NO_2$ increases the temperatures of the catalyst composition of low-temperature light-off performance and the catalyst disposed downstream thereof, to such levels that the reaction between combustible components and $O_2$ can take place, the above two reactions, i.e. the reaction between combustible components and $NO_2$ and the reaction between combustible components and $O_2$ proceed together (when $NO_2$ is exhausted, only the latter reaction, i.e. the reaction between combustible components and $O_2$ proceeds).

The $NO_2$ used for reaction with combustible components, other than the small amount contained in an exhaust gas to be purified may be produced by the reaction between nitrogen monoxide (NO) contained in exhaust gas and $O_2$, which takes place on the precious metal, or may be supplied from outside. In the case of a vehicle (e.g. automobile), mounting of $NO_2$ source thereon is difficult and the former approach (production of $NO_2$ by the reaction between NO and $O_2$) is preferred.

In the present invention, $NO_2$ is once absorbed by the nitrogen dioxide absorber of the catalyst composition of low-temperature light-off performance and then released therefrom to be used for the reaction with combustible components on the precious metal of the catalyst composition. The absorption and release of $NO_2$ may take place simultaneously during cold start; or, $NO_2$ may be absorbed by and stored in the nitrogen dioxide absorber during steady-state operation and the absorbed and stored $NO_2$ may be released during the next cold start. Or, $NO_2$ may be absorbed by and stored in the nitrogen dioxide absorber during steady-state operation and the absorption and release of $NO_2$ may take place simultaneously during the next cold start.

The mode of conducting the absorption and release of $NO_2$ simultaneously is effective in a system in which a relatively large amount of NO is generated during cold start, or in a system in which a relatively large mount of $NO_2$ can be introduced from outside. Meanwhile, in the mode of storing $NO_2$ beforehand, $NO_2$ can be stored during steady-state operation by taking much time; therefore, the mode can be employed even when NO cannot be supplied sufficiently during cold start. As a matter of course, the amount of $NO_2$ stored during steady-state operation for use during cold start varies depending upon the conditions of the steady-state operation.

As mentioned above, the catalyst composition of low-temperature light-off performance according to this invention comprises a substance having at least one of the two functions, i.e. (a) an electron donatability and (b) a nitrogen dioxide ($NO_2$) absorbability and releasability.

In the present invention, when the amount of the NO contained in exhaust gas is very small (this NO reacts with $O_2$ on the precious metal of the catalyst composition and generates $NO_2$) or when the amount of the $NO_2$ supplied from outside is very small, the reaction mechanism based on the electron donatability of the electron donor becomes dominant and, owing to the low-temperature light-off caused by this reaction mechanism, the HC desorbed from the adsorbent is purified effectively.

Meanwhile, when the amount of the NO contained in exhaust gas is sufficiently large to generate a reaction heat which can act as a trigger of light-off (this NO reacts with $O_2$ on the precious metal of the catalyst composition and generates $NO_2$) or when $NO_2$ can be supplied from outside in an amount sufficient to generate a reaction heat which can act as a trigger of light-off, the reaction mechanism based on the nitrogen dioxide absorbability and releasability of the nitrogen dioxide absorber becomes dominant; in this case, the light-off takes place at even lower temperatures and a higher effect is obtained. As a matter of course, the reaction mechanism based on the electron donatability of the electron donor and the reaction mechanism (the mechanism by light-off trigger) based on the nitrogen dioxide absorbability and releasability of the nitrogen dioxide absorber may take place simultaneously.

In the reaction mechanism based on the electron donatability of the electron donor, the precious metal is necessary for the reaction between HC and $O_2$ and/or the reaction between CO and $O_2$.

Meanwhile in the reaction mechanism based on the nitrogen dioxide absorbability and releasability of the nitrogen absorber, the precious metal is necessary only for the reaction between $NO_2$ and combustible components when $NO_2$ is supplied from outside; and when $NO_2$ is generated by the reaction between $O_2$ and the NO contained in exhaust gas, the precious metal is necessary for the generation of $NO_2$ and also for the reaction between the generated $NO_2$ and combustible components.

The precious metal acting to generate $NO_2$ (hereinafter referred to as "the generation PM") and the precious metal acting to react combustible components and $NO_2$ (hereinafter referred to as "the reaction PM") may be the same precious metal or different precious metals. When the generation PM and the reaction PM are the same precious metal, they are naturally disposed at the same position (the nitrogen dioxide absorber is also disposed at the same position inevitably). When the generation PM and the reaction PM are different precious metals, they may be made of the same material or of different materials and may be disposed at the same position or at different positions.

In the mechanism by light-off trigger, the following major reactions (1) to (3) take place on the precious metal.

$$NO + \tfrac{1}{2}O_2 \rightarrow NO_2 \tag{1}$$

$$\text{Combustible components (e.g. HC, CO and } H_2) + NO_2 \rightarrow CO_2 + N_2 + H_2O \tag{2}$$

$$\text{Combustible components (e.g. HC, CO and } H_2) + O_2 \rightarrow CO_2 + H_2O \tag{3}$$

[The reaction (3) takes place after a heat has been generated in the reaction (2).]

As the precious metal which gives rise to the above reactions and the reaction mechanism based on the electron donatability of the electron donor, at least one precious metal selected from Pt, Pd and Rh is suitable. Pt and/or Pd is more suitable because, when Rh is used, a $NO_x$ decomposition reaction and/or a $NO_x$ reduction reaction takes place besides the above reactions.

In the present invention, the substance having an electron donatability and/or a nitrogen dioxide absorbability and releasability (the substance is hereinafter referred to as "the electron donor and/or nitrogen dioxide absorber") is composed of a particular metal element or an oxide thereof (including a compound oxide) both having an electron donatability and/or a nitrogen dioxide absorbability and releasability.

With respect to the electron donatability of the electron donor and/or nitrogen dioxide absorber, a metal oxide (MO) having a higher solid basicity is thought to have a higher electron donatability. Therefore, a substance having a higher solid basicity is preferred from the standpoint of electron donatability.

Meanwhile, with respect to the nitrogen dioxide absorbability and releasability of the electron donor and/or nitrogen dioxide absorber, the following equilibrium (4) holds for any metal oxide (MO).

$$MO + NO_2 \rightleftharpoons MNO_3 \tag{4}$$

Since $NO_2$ is acidic, a metal oxide having a higher solid basicity absorbs a larger amount of $NO_2$. Meanwhile, a metal oxide having a higher solid basicity holds $NO_2$ up to high temperatures and has a low $NO_2$ releasability. Hence, in the present invention, it is necessary to select a metal oxide having an appropriately high solid basicity.

From this standpoint, there is mentioned, as the electron donor and/or nitrogen dioxide absorber suitably used in the present invention, at least one element selected from the group consisting of alkali metals, alkaline earth metals, rare earth elements, transition metals and actinide elements, or an oxide thereof (including a compound oxide).

Of the above substances, preferable from the standpoint of durability is at least one element selected from the group consisting of Li, Cs, Mg, Ca, Sr, Ba, Y, Ti, Zr, Hf, La, Ce, Pr, Nd, Th and U, or an oxide thereof (including a compound oxide). Particularly preferable from the standpoints of cost, durability, etc. is at least one element selected from the group consisting of Cs, Mg, Sr, Ba, Y, Zr, Hf, La, Ce and Th, or an oxide thereof (including a compound oxide).

In the present invention, it is preferable to add $CeO_2$ (which has an $O_2$ storability and releasability) to the catalyst composition of low-temperature light-off performance to promote the reaction between HC and $O_2$ based on the electron donatability of the electron donor and/or the reaction between combustible components and $O_2$ caused by the heat generated by the mechanism by light-off trigger. Moreover, the addition of $CeO_2$ widens the operational range (window) of three-way catalyst and consequently enhances the performance of three-way catalyst during steady-state operation. However, when the catalyst composition of low-temperature light-off performance contains Rh, Rh tends to form a solid solution with $CeO_2$ or the like and is deactivated; therefore, it is preferable that Rh and $CeO_2$ are contained apart in the catalyst composition. $CeO_2$ is preferably used in the form of a compound oxide with $ZrO_2$ because the compound oxide has a higher oxygen storage capability.

Next, description is made on the adsorbent having a hydrocarbon adsorbability, used in the first invention. The adsorbent having a hydrocarbon adsorbability includes zeolite, active carbon, etc. In order for the adsorbent to be disposed in an exhaust pipe, the adsorbent must withstand at least 500° C. and is composed mainly of preferably zeolite, SAPO (silicoaluminophosphate), ALPO (aluminophosphate) or the like, particularly preferably zeolite. The zeolite used in the present invention may be a natural or synthetic product, and there is no particular restriction as to the kind of the zeolite. However, a zeolite having an $SiO_2/Al_2O_3$ molar ratio of 40 or more is preferable from the standpoints of heat resistance, durability and hydrophobicity, and a zeolite having an $SiO_2/Al_2O_3$ molar ratio of 80 or more is more preferable. Typical examples of the preferable zeolite are ZSM-5, USY, β-zeolite, silicalite and metallosilicate.

These zeolites may be used singly or in combination of a plurality of zeolites. Use of a plurality of zeolites of different pore diameters in combination is preferable because it can allow the adsorption of various hydrocarbons ranging from small-molecule hydrocarbons (e.g. ethylene and propylene) to large-molecule hydrocarbons (e.g. toluene and xylene). This plurality of zeolites may be present in the adsorbent in a mixed state or may be disposed in a plurality of layers. When the adsorbent is used by being supported on a carrier, the plurality of zeolites may be supported on the carrier apart from each other in the flow path of exhaust gas; for example, the plurality of zeolites may be supported on one same monolithic carrier apart at the upstream side of the carrier and at the downstream side, or, may be supported on different carriers.

Zeolite can be used per se as the adsorbent but, in order to control coking which occurs simultaneously with the adsorption of HC, etc., it is preferred that at least one precious metal selected from Pt, Pd, Rh, etc. is supported on zeolite, whereby the adsorbability of zeolite can be regenerated without any deterioration. As the precious metal which can be supported on zeolite, Pd is preferable, because it is most inexpensive and has a high ability for regeneration of zeolite. In order to support the precious metal on zeolite, an ion exchange method is preferable from the standpoint of thermal stability when the precious metal is supported directly on zeolite. When a precious metal supported on an inorganic oxide (e.g. active alumina) is mixed with zeolite, not only zeolite can be regenerated sufficiently, but also this approach is preferable because the adsorbent has even a catalytic activity.

As mentioned above, when a precious metal is supported on zeolite, the precious metal has not only the ability for zeolite regeneration but also a catalytic activity. However, the precious metal in zeolite is liable to cohere and gives poor catalytic durability. Hence, when the adsorbent is allowed to have a catalytic activity, it is preferable to allow a catalyst component to be contained in the adsorbent apart from zeolite. In addition to a precious metal, this catalyst component may be an electron donor and/or nitrogen dioxide absorber such as contained in the catalyst composition of low-temperature light-off performance. In this case, the catalyst component contained in the adsorbent exhibits a catalytic activity from lower temperatures, showing a higher effect for the purification of the HC desorbed from the adsorbent.

When the adsorbent contains a catalyst component, the addition of a rare earth element oxide (e.c. $CeO_2$, $La_2O_3$ or $CeO_2$-$ZrO_2$)having an oxygen storage capability, to the adsorbent is preferable because the three-way performance of the catalyst component during steady-state operation is enhanced.

It is also preferable to allow zeolite to contain at least one ion selected from the ions of group IB elements (Cu, Ag and Au) of periodic table, because the resulting zeolite can have an improved HC adsorbability. The content of the ion in zeolite is preferably 20% or more, more preferably 40% or more based on the Al atom in zeolite because a low content of the ion gives only small improvement in HC adsorbability.

In the system for exhaust gas purification according to the first invention, it is preferable from the following reason that the adsorbent is disposed upstream of the catalyst composition of low-temperature light-off performance in the flow path of exhaust gas, or the adsorbent and the catalyst composition of low-temperature light-off performance are disposed at nearly same positions in the flow path of exhaust gas with no distance taken between them (for example, they are used as a mixture of in piled-up layers). That is, in the present invention, the adsorbent adsorbs the HC, etc. contained in the exhaust gas generated in an internal combustion engine during the cold start and, as the temperature of the adsorbent is elevated by the exhaust gas, desorbs the adsorbed HC, etc.; therefore, when the catalyst composition of low-temperature light-off performance is disposed downstream of the adsorbent in the flow path of exhaust gas or very closely to the adsorbent in the flow path of exhaust gas, the purification efficiency for the HC, etc. generated during cold start is enhanced remarkably. When the adsorbent contains a catalyst component, the HC, etc. desorbed from the adsorbent is purified even by the adsorbent itself. This catalyst component is preferably a precious metal and an electron donor and/or nitrogen dioxide absorber, both such as contained in the catalyst composition of low-temperature light-off performance.

In the present invention, the HC, etc. adsorbed by the adsorbent is desorbed with the rise in adsorbent temperature and purified by the catalyst composition of low-temperature light-off performance. As mentioned previously, the catalyst composition of low-temperature light-off performance used in this invention, as compared with conventional catalysts, gives light-off at a lower temperature owing to the reaction mechanism based on electron donatability and/or the reaction mechanism based on nitrogen dioxide absorbability and releasability; as a result, the difference between the initial temperature of HC desorption from adsorbent and the light-off temperature of catalyst composition is small and the HC generated in a large amount during cold start can be purified effectively.

In the system for exhaust gas purification according to this invention, other catalyst(s) for exhaust gas purification may be disposed upstream an/or downstream of the adsorbent and the catalyst composition of low-temperature light-off performance in the flow path of exhaust gas. Preferably, the other catalyst(s) contains (contain) a catalyst composition of low-temperature light-off performance.

In the first invention, the application forms of the catalyst composition of low-temperature light-off performance and the adsorbent have no particular restriction. For example, the catalyst composition and the adsorbent may be shaped into respective structures by themselves. Or, they may be supported on respective carriers.

Description is then made on the second invention. In the system for exhaust gas purification according to the second invention, the catalyst giving an excellent light-off performance at low temperatures (hereinafter referred to as "the catalyst of low-temperature light-off performance" or simply as "the catalyst") comprises a carrier and a catalyst layer supported thereon, the catalyst layer comprising a precious metal and an electron donor and/or nitrogen dioxide absorber. The mechanism of exhaust gas purification by this catalyst of low-temperature light-off performance is the same as that by the catalyst composition of low-temperature light-off performance of the first invention. In the second invention, however, the catalyst of low-temperature light-off performance is constituted by supporting, on a particular carrier, a catalyst layer comprising the same precious metal and same electron donor and/or nitrogen dioxide absorber as contained in the catalyst composition of the first invention.

There is no particular restriction as to the kind of the carrier, and various carriers such as monolithic carrier, pellets, beads, ring and the like can be used. Of these, a monolithic carrier is most preferred. The monolithic carrier is generally called a honeycomb structure and refers to a structure having a large number of passages (cells) divided by partition walls. The monolithic carrier is preferably made of a ceramic (e.g. cordierite or mullite), a foil-shaped heat-resistant stainless steel (e.g. Fe—Cr—Al alloy) or a honeycomb-shaped metal produced by powder metallurgy.

The passages (cells) of the monolithic carrier may have any desired shape such as circle, polygon, corrugate or the like. The monolithic carrier is produced so as to have a desired external form suited for the inside structure of the exhaust gas line in which it is disposed. There is no particular restriction, either, as to the cell density of monolithic carrier, but the cell density is preferably in the range of 6–1,500 cells/in$^2$ (cpi$^2$) (0.9–233 cells/cm$_2$). The partition wall thickness of monolithic carrier is preferably 50–2,000 $\mu$m.

The monolithic carrier may be porous or nonporous. The porosity of the monolithic carrier is not restricted but is preferably 0–50%, more preferably 5–25% from the standpoints of the strength, oxidation resistance, corrosion resistance and adhesivity to catalyst layer. The monolithic carrier may be a metallic monolithic carrier provided with electrodes so that the carrier can be electrically heated (such a monolithic carrier is called a honeycomb heater). With this honeycomb heater, the light-off of the catalyst of low-temperature light-off performance can be enhanced.

The catalyst layer may be supported on the carrier in a state that the precious metal and the electron donor and/or nitrogen dioxide absorber are mixed in the catalyst layer. When the carrier is a monolithic carrier, it is possible that the catalyst layer is prepared in two layers, i.e. a layer containing the precious metal and a layer containing the electron donor and/or nitrogen dioxide absorber and that the two layers are supported on different monolithic carriers, or on one same monolithic carrier apart in the flow path of exhaust gas, or on one same carrier (this carrier need not be a monolithic carrier) in piled-up layers.

When the precious metal and the electron donor and/or nitrogen dioxide absorber are mixed in the catalyst layer and are supported on the carrier or when the layer containing the precious metal and the layer containing the electron donor and/or nitrogen dioxide absorber are supported on the carrier in piled-up layer, the precious metal and the electron donor and/or nitrogen dioxide absorber are naturally disposed at nearly same positions in the flow path of exhaust gas with no distance taken between them. Particularly in the former case where the precious metal and the electron donor and/or nitrogen dioxide absorber are mixed in the catalyst layer and are supported on the carrier, the degree of contact between the precious metal and the electron donor and/or nitrogen dioxide absorber is high and, as a result, the NO$_2$ generated on the precious metal is efficiently absorbed by the electron donor and/or nitrogen dioxide absorber. Further in the former case, the NO$_2$ released from the electron donor and/or nitrogen dioxide absorber reacts more easily with combustible components on the precious metal. Furthermore in the former case, the high degree of contact between the precious metal and the electron donor and/or nitrogen dioxide absorber promises easier electron donation.

Also when the layer containing the precious metal and the layer containing the electron donor and/or nitrogen dioxide absorber are supported on the carrier in piled-up layers, the effects similar to the former case (where the precious metal and the electron donor and/or nitrogen dioxide absorber are mixed in the catalyst layer and are supported on the carrier) are obtained because the precious metal contained in its layer and the electron donor and/or nitrogen dioxide absorber contained in its layer have sufficient contact with each other at the boundary of the two layers. When the precious metal and the electron donor and/or nitrogen dioxide absorber have greatly different heat resistances and are mixed in the catalyst layer, it is highly probable that when either one of them having a low heat resistance gives rise to cohesion, even the other having a high heat resistance is involved in the cohesion. Such a problem can be prevented when the layer containing the precious metal and the layer containing the electron donor and/or nitrogen dioxide absorber are supported on the carrier in piled-up layers.

When the layer containing the precious metal and the layer containing the electron donor and/or nitrogen dioxide absorber are supported on the carrier in piled-up layers, it is preferable that the layer containing the precious metal is formed as an upper layer containing the electron donor and/or nitrogen dioxide absorber is formed as a lower layer, so that a process of "adsorption of NO contained in exhaust gas, on precious metal→NO$_2$ generation →NO$_2$ absorption→NO$_2$ release and diffusion→reaction→release of reaction products (CO$_2$, H$_2$O, etc.) into exhaust gas" can proceed smoothly.

When two or more kinds of precious metals are used, they may be contained in respective layers and supported on the carrier in piled-up layers, to prevent alloying between the precious metals. When two or more kinds of electron donors and/or nitrogen dioxide absorbers are used, they may be supported in a mixed state or may be contained in respective layers and supported on the carrier in piled-up layers.

Meanwhile, when the layer containing the precious metal and the layer containing the electron donor and/or nitrogen dioxide absorber are supported on different monolithic carriers or when they are supported on one same monolithic carrier apart in the flow path of exhaust gas, the precious metal and the electron donor and/or nitrogen dioxide absorber are naturally disposed apart in the flow path of exhaust gas.

In these cases, the degree of contact between the precious metal and the electron donor and/or nitrogen dioxide absorber is low. Therefore, these cases, as compared with the cases where the precious metal and the electron donor and/or nitrogen dioxide absorber are supported in a mixed state or in piled-up layers, are inferior in the absorbability of NO$_2$ generated on precious metal, the reactivity of NO$_2$ released from electron donor and/or nitrogen dioxide absorber, with combustible components on precious metal, and the donatability of electrons. However, these cases are even more preferable than the case where the precious metal and the electron donor and/or nitrogen dioxide absorber are supported in piled-up layers, from the standpoint of prevention of the above-mentioned problem that when the precious metal and the electron donor and/or nitrogen dioxide absorber have greatly different heat resistance and when either one of them having a low heat resistance gives rise to cohesion even the other having a high heat resistance is involved in the cohesion.

When the layer containing the precious metal and the layer containing the electron donor and/or nitrogen dioxide absorber are supported on different monolithic carriers, there is an advantage that the carriers may have different diameters and/or cell structures or may vary in kinds. Meanwhile, there is no such advantage when the layer containing the precious metal and the layer containing the electron donor and/or nitrogen dioxide absorber are supported on one same monolithic carrier apart in the flow path of exhaust gas; however, in this case, as compared with the former case where the layer containing the precious metal and the layer containing the electron donor and/or nitrogen dioxide absorber are supported on different monolithic carriers, the precious metal and the electron donor and/or nitrogen dioxide absorber can be disposed closely and, moreover, there is no heat loss between carriers as seen when different carriers are disposed apart.

Also in the second invention, as mentioned in the first invention, the generation PM and the reaction PM may be the same precious metal or different precious metals when $NO_2$ is obtained by the reaction of NO contained in exhaust gas, with $O_2$. When the generation PM and the reaction PM are different precious metals, they may be mixed in the catalyst layer; or, the catalyst layer may be divided into two layers, i.e. a layer containing the generation PM and a layer containing the reaction PM, and the two layers may be supported on different monolithic carriers or on one same monolithic carrier in piled-up layers or apart at different positions (for example, at the upstream side of the carrier and at the downstream side). In these cases, the electron donor and/or nitrogen dioxide absorber may be contained in at least either one of the layer containing the generation PM and the layer containing the reaction PM; or, a layer containing the electron donor and/or nitrogen dioxide absorber may be prepared and may be supported on a monolithic carrier where the generation PM-containing layer and the reaction PM-containing layer are supported or on a monolithic carrier where nothing is supported.

As mentioned above, the generation PM, the reaction PM and the electron donor and/or nitrogen dioxide absorber can be disposed in various modes. They, however, are preferably disposed closely to each other.

When the generation PM (this is unnecessary when $NO_2$ is supplied from outside or when only the reaction mechanism based on electron donatability is utilized), the electron donor and/or nitrogen dioxide absorber and the reaction PM are disposed in this order in the flow path of exhaust gas with the generation PM disposed most upstream, each of them can fulfill its task even if they are disposed apart, and a cycle of ($NO_2$ generation→) $NO_2$ absorption and storage→$NO_2$ release→reaction can occur effectively. However, it is preferable that the electron donor and/or nitrogen dioxide absorber and the reaction PM are disposed at nearly same positions in the flow path of exhaust gas with no distance taken between them, in order to make active the reaction of $NO_2$ released from electron donor and/or nitrogen dioxide absorber, with combustible components on precious metal. When the $NO_2$ to be reacted with combustible components is produced from the NO contained in exhaust gas, it is preferable that the generation PM as well is disposed very closely to the electron donor and/or nitrogen dioxide absorber in the flow path of exhaust gas with no distance taken between them, in order to increase the absorbability of absorber for $NO_2$ generated on generation PM.

In the catalyst layer of the catalyst of the second invention, the kind of the precious metal, the kind of the element or oxide thereof constituting the electron donor and/or nitrogen dioxide absorber, etc. are the same as in the catalyst composition of the first invention. As in the first invention, it is preferable to add $CeO_2$ to the catalyst layer.

To the catalyst layer may be added a heat-resistant inorganic oxide having a large specific surface area, as a substrate on which the precious metal and/or the electron donor and/or nitrogen dioxide absorber is supported in a highly dispersed state. As the substrate, there can be suitably used active alumina, zirconia, silica, titania, zeolite, etc. Of these, an active alumina having a specific surface area of 50 $m^2/g$ or more is preferred. By supporting the precious metal on such an active alumina of large specific surface area, not only the precious metal can be supported in a highly dispersed stage, but also the contact area between the precious metal and exhaust gas can be made large.

In the catalyst layer, the precious metal may be supported directly on the electron donor and/or nitrogen dioxide absorber. In this case, the degree of contact between the precious metal and the electron donor and/or nitrogen dioxide absorber is higher; the transferability of $NO_2$ is higher; and the donatability of electrons is higher. When the electron donor and/or nitrogen dioxide absorber as well is supported on active alumina, the degree of contact between the absorber and exhaust gas can be enhanced. Therefore, it is one preferable approach that both the precious metal and the electron donor and/or nitrogen dioxide absorber are supported on an active alumina powder to prepare a catalyst layer and this catalyst layer is supported on a monolithic carrier.

With respect to the amount of precious metal used, too small an amount gives no sufficient catalytic activity and too large an amount causes cohesion (this results in reduced dispersion) and invites a higher cost. The amount of the precious metal used is, when a monolithic carrier is used, preferably 10–700 $g/ft^3$ (volume of monolithic carrier, more preferably 30–250 $g/ft^3$ (volume of monolithic carrier).

When the precious metal is supported on the above-mentioned substrate or on the electron donor and/or nitrogen dioxide absorber, the amount of the precious metal supported thereon is preferably 0.1–30% by weight based on the amount of the substrate or the absorber. When the amount is less than 0.1% by weight, there is a problem in durability. When the amount is more than 30% by weight, there is a problem in dispersibility of precious metal. 0.1–15% by weight is more preferable when a cost factor is taken into consideration.

The amount of the electron donor and/or nitrogen dioxide absorber used is, when the carrier is a monolithic carrier, preferably 0.005–1.0 g/cc (volume of monolithic carrier). When the amount is less than 0.005 g/cc, the effect of the absorber is insufficient. When the amount is more than 1.0 g/cc, a large pressure loss arises. When the electron donor and/or nitrogen dioxide absorber is supported on a substrate such as active alumina or the like, the amount of the absorber is preferably 10–100% by weight based on the amount of the substrate and, in view of the $NO_2$ absorbability, more preferably 35–100% by weight.

The film thickness of the catalyst layer formed on the carrier is preferably 10–150 μm. When the thickness is smaller than 10 μm, there is a problem in durability. When the thickness is larger than 150 μm, the diffusion of exhaust gas into the interior of the catalyst layer is difficult, making impossible the effective utilization of the catalyst layer interior.

Next, description is made on examples of the method for production of the catalyst of low-temperature light-off performance according to the second invention. The production methods include the following two main methods, i.e. an impregnation method and a predoping method which differ in the way of supporting the precious metal and/or the electron donor/and or nitrogen dioxide absorber.

Impregnation Method

Active alumina, which later becomes a substrate for high dispersion of a precious metal and/or an electron donor and/or nitrogen dioxide absorber, is coated on a carrier, followed by firing, to prepare an alumina-coated carrier. The alumina-coated carrier is dipped in a solution of a precious metal and/or an electron donor and/or nitrogen dioxide absorber to support the precious metal and/or the electron donor and/or nitrogen dioxide absorber on the alumina, after which drying and firing are conducted. Alternatively, an electron donor and/or nitrogen dioxide absorber is supported directly on a carrier; the electron donor and/or nitrogen dioxide absorber-supported carrier is dipped in a solution of a precious metal; and drying and firing are conducted. As an another approach, alumina and an electron donor and/or nitrogen dioxide absorber are supported on a carrier; the resulting carrier is dipped in a solution of a precious metal and, as necessary, an electron donor and/or nitrogen dioxide absorber; and, drying and firing are conducted.

Predoping Method

A precious metal and/or an electron donor and/or nitrogen dioxide absorber is supported on an active alumina powder as a substrate, and the resulting alumina powder is coated on a carrier, followed by firing. Incidentally, the precious metal may be supported on an electron donor and/or nitrogen dioxide absorber powder. In coating on a carrier, an electron donor and/or nitrogen dioxide absorber powder may be added as necessary. When two or more kinds of precious metals are supported, if these different precious metals are mixed and then supported on an active alumina powder or an electron donor and/or nitrogen dioxide absorber powder, it may invite alloying between the precious metals and consequent deterioration of catalyst performance. Hence, when two or more kinds of precious metals are supported, it is preferred to prepare different alumina powders each supporting a different precious metal, for example, a Pt-supported alumina powder, a Pd-supported alumina powder and a Rh-supported alumina powder, mix these powders, and coat the mixed powder on a carrier.

With respect to the supporting of a precious metal, the predoping method is preferred to the impregnation method from the standpoint of the durability of the resulting catalyst.

Next, description is made on the adsorbent used in the second invention. The adsorbent comprises a carrier and a adsorbent layer having a hydrocarbon absorbability, supported thereon. There is no particular restriction as to the kind of the carrier, and there can be used various carriers such as monolithic carrier, pellets, beads, ring and the like.

Of these carriers, a monolithic carrier is preferred for the same reasons as mentioned with respect to the catalyst of low-temperature light-off catalyst. The adsorbent layer of the adsorbent is preferably composed mainly of zeolite as is so with the adsorbent of the first invention. Also, the same description as made for the adsorbent of the first invention with respect to the preferable $SiO_2/Al_2O_3$ ratio of zeolite, the addition of precious metal, group IB element, etc. to zeolite, and so forth can be applied to the adsorbent layer of the adsorbent of the second invention.

When the carrier is a monolithic carrier and a precious metal is supported on the zeolite constituting the adsorbent layer, the amount of the precious metal supported is preferably 5–200 $g/ft^3$ (volume of monolithic carrier) from the standpoints of adsorbent cost and regeneratability. The zeolite may contain, as necessary, 5–20% by weight of an inorganic binder such as $Al_2O_3$, $SiO_2$ or the like, whereby strong bond between adsorbent layer and carrier can be obtained without impairing the absorbability for HC, etc.

When it is intended to allow the adsorbent to have a catalytic activity besides the hydrocarbon absorbability, the adsorbent layer of the adsorbent can contain a catalyst component as in the adsorbent of the first invention. This catalyst component may contain a precious metal and an electron donor and/or nitrogen dioxide absorber, both such as contained in the catalyst layer of the catalyst of low-temperature light-off performance. Alternatively, a layer containing a catalyst component may be formed on the adsorbent layer or between the adsorbent layer and the carrier. For example, it is one preferable approach from the standpoint of adsorbent durability to support, on a carrier, an adsorbent layer made of zeolite and a layer comprising (a) an heat-resistant inorganic oxide (e.g. active alumina) and (b) a precious metal and an electron donor and/or nitrogen dioxide absorber, supported on (a). In this case, formation of the catalyst component-containing layer on the adsorbent layer gives a higher catalytic activity. The catalyst component-containing layer may further contain a rare earth element oxide.

Figure 34:
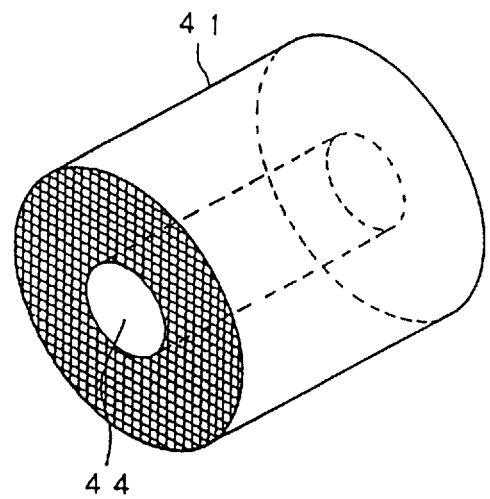
FIG. 34 is a drawing showing an adsorbent used in the system for exhaust gas purification according to the present invention.
Figure 35:
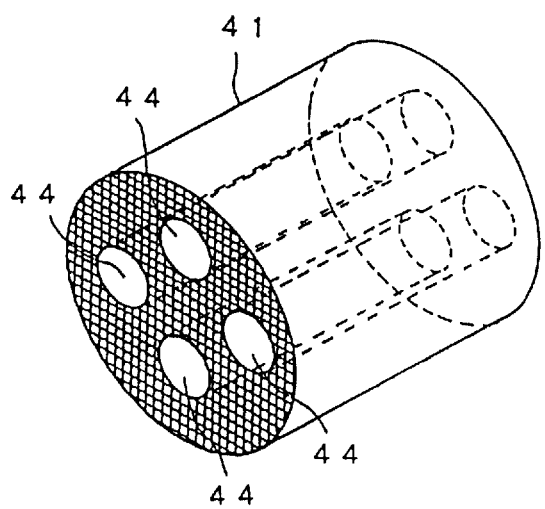
FIG. 35 is a drawing showing an adsorbent used in the present system.

When the carrier of the adsorbent is a monolithic carrier, a blowing-through portion may by formed in part of the monolithic carrier so that and exhaust gas to be purified can blow through the portion. This blowing-through portion is a hollow portion or a portion no catalyst layer is supported (i.e. a non-supported portion), both extending from the exhaust gas inlet to the gas outlet. The hollow portion or non-supported portion may be present at one or more places. The cross-sectional area of the hollow portion or the non-supported portion is preferably smaller than 50% of the cross-sectional area of the monolithic carrier. The blowing-through portion is preferably formed substantially parallel to the passages (cells) of the monolithic carrier. Preferable embodiments of the adsorbent having a blowing-through portion includes, for example, those shown in FIGS. 34 and 35. In these figures, 41 is a monolithic carrier and 44 is a blowing-through portion (a hollow portion).

The system for exhaust gas purification according to the second invention is constituted by disposing the catalyst of low-temperature light-off performance and the adsorbent in the exhaust pipe of internal combustion engine. The mechanism of exhaust gas purification using this system is the same as the above-mentioned mechanism of exhaust gas purification using the system for exhaust gas purification according to the first invention. In the system of the second invention as well, it is preferable that the adsorbent is disposed upstream of the catalyst of low-temperature light-off performance in the flow path of exhaust gas, for the same reason as in the system of the first invention. In the second invention, it is possible that the adsorbent and the catalyst of low-temperature light-off performance are formed in one monolithic carrier by supporting the catalyst layer of the catalyst of low-temperature light-off performance and the adsorbent layer of the adsorbent on the different positions (for example, the upstream side and the downstream side) of one monolithic carrier. In this case also, it is preferable that the adsorbent is present at the catalyst of low-temperature light-off performance is present at the downstream side of said path.

In the system of the second invention, the numbers of the catalyst of low-temperature light-off performance and the adsorbent both disposed in an exhaust pipe may be each one, or at least one of them may be two or more. Other element, for example, an adsorbent-catalyst as mentioned in the third invention described later may be disposed in combination with the catalyst and the adsorbent. Preferably, these elements are combined appropriately and disposed continuously in the flow path of exhaust gas so that the HC, etc. generated during cold start can be purified efficiently.

In the system, it is preferable that the adsorbent layer of at least either of the adsorbent and the adsorbent-catalyst contains a precious metal and an electron donor and/or nitrogen dioxide absorber, both such as contained in the catalyst layer of the catalyst of low-temperature light-off performance, or that the catalyst of low-temperature light-off performance is disposed downstream of the adsorbent or the adsorbent-catalyst.

Other catalyst(s) for exhaust gas purification may be disposed upstream and/or downstream of the adsorbent and the catalyst of low-temperature light-off performance in the flow path of exhaust gas, or between the adsorbent and the catalyst low-temperature light-off performance. When this other catalyst for exhaust gas purification is disposed upstream, it causes light-off at an early timing owing to the high temperature of exhaust gas and the heat generated by the reaction is transmitted to the catalyst. etc. disposed downstream. When the other catalyst for exhaust gas purification is disposed downstream, it receives the heat generated by catalyst of low-temperature light-off performance and causes light-off at an early timing, and assist the purification of the HC, etc. desorbed from the adsorbent and the adsorbent-catalyst. Preferably, the other catalyst(s) for exhaust gas purification as well contains (contain) a precious metal and an electron donor and/or nitrogen dioxide absorber, both such as contained in the catalyst layer of the catalyst of low-temperature light-off performance.

In order to obtain an improved purification performance (mainly during steady-state operation) in the whole of the FTP test so as to meet the tightened exhaust gas regulation of U.S., it is preferable that at least one of the other catalysts for exhaust gas purification, disposed upstream and/or downstream of the system has a certain volume (about 50–150%) relative to the engine displacement. When the other catalyst is disposed upstream, there is an advantage that this catalyst of relatively large volume reaches high temperatures during steady-state operation owing to the heat of exhaust gas and shows a high catalytic activity. When the other catalyst is disposed downstream, there is an advantage that the heat of exhaust gas generated during cold start can be transmitted to the catalyst of low-temperature light-off performance without being absorbed by the other catalyst of relatively large volume.

In the system, it is preferable that the individual elements are disposed in an exhaust pipe closely to each other so that the reaction heat generated in the catalyst of low-temperature light-off performance, etc. can be quickly transmitted to the other catalyst, etc. located downstream and thereby the light-off the other catalyst, etc. can be promoted.

Next, description is made on the third invention. With respect of the catalyst giving an excellent light-off performance at low temperatures (hereinafter referred to as "the catalyst of low-temperature light-off performance" or simply as "the catalyst"), used in the system for exhaust gas purification according to the third invention, no description is made because the catalyst has the same constitution and purification mechanism as the catalyst of low-temperature light-off performance according to the second invention. The adsorbent-catalyst of the third invention comprises a monolithic carrier, an adsorbent layer having a hydrocarbon absorbability and a catalyst layer having a three-way catalytic activity or an oxidizing ability, the adsorbent layer and the catalyst layer being separately supported on the monolithic carrier in all or part of the cross sections of the adsorbent-catalyst perpendicular to the flow direction of exhaust gas. With respect to the adsorbent layer, its constitution, etc. are the same as those of the adsorbent layer of the adsorbent in the second invention.

The catalyst layer contains at least one precious metal selected form Pt, Pd and Rh, in order to be able to exhibit a three-way catalytic activity or an oxidizing ability. The precious metal is preferably supported on a heat-resistant oxide such as $Al_2O_3$, $SiO_2$, $TiO_2$, $ZrO_2$ or the like. Preferably, the catalyst layer further contains, besides the precious metal, an electron donor and/or nitrogen dioxide absorber such as contained in the catalyst layer of the catalyst of low-temperature light-off performance whereby the catalyst layer can cause light-off at lower temperatures and, together with the catalyst of low-temperature light-off performance, can effectively purify the HC, etc. desorbed from the adsorbent layer. Also, addition of an oxide of oxygen storage capability (e.g. $CeO_2$, $La_2O_3$ or $CeO_2$-$ZrO_2$) to the catalyst layer is preferable because the catalyst layer can show a higher activity during steady-state operation.

Figure 36:
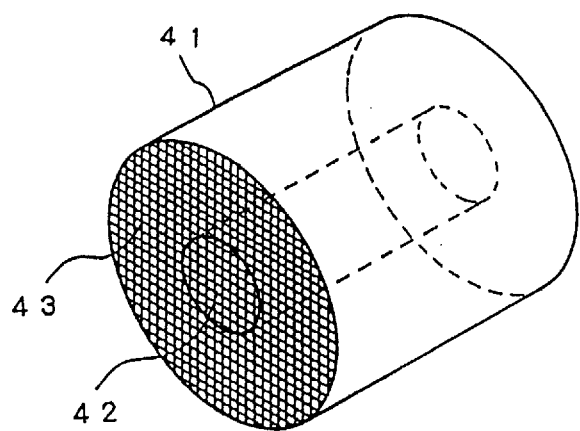
FIG. 36 is a drawing showing an adsorbent-catalyst used in the system for exhaust gas purification according to the present invention.

In the adsorbent-catalyst of the third invention, the adsorbent layer and the catalyst layer are separately supported on the monolithic carrier in all or part of the cross sections of the catalyst-adsorbent perpendicular to the flow direction of exhaust gas. A preferable example of the adsorbent-catalyst is a monolithic structure 41 as shown in FIG. 36, which has a circular cross section perpendicular to the flow direction of an exhaust gas to be purified and is formed in a cylindrical shape extending parallel to said flow direction and in which a catalyst layer is supported on the inner cylindrical portion 42 of certain radius, having the same axis as the structure and an adsorbent layer is supported on the outer (remaining) cylindrical portion 43. The cross-sectional area of the portion of which the catalyst layer is supported (this portion is hereinafter referred to as "the catalyst portion"), is particularly preferably 5–80% of the cross-sectional area of the structure, for the early ignition of the catalyst portion.

The portion on which the adsorbent layer is supported (this portion is hereinafter referred to as "the adsorbent portion"), preferably has a small temperature elevation rate so that the initial timing of desorption of the HC adsorbed during cold start becomes as late as possible. Meanwhile, the catalyst portion preferably has a large temperature elevation rate so that the ignition of the portion takes place as early as possible. Therefore, it is preferable to allow the adsorbent portion to have a larger heat capacity than the catalyst portion by various methods, for example, (1) making larger the wall thickness of the adsorbent portion, (2) making higher the cell density of the adsorbent portion, (3) making smaller the porosity of the adsorbent portion, (4) using a material (e.g. a metal) of larger heat capacity for the adsorbent portion, and (5) supporting a larger amount of an adsorbent layer on the adsorbent portion. The reverse is true for the catalyst portion and various methods can be employed in order to allow the catalyst portion to have a smaller heat capacity than the adsorbent portion. Particularly preferable are methods such as (1) making smaller the wall thickness of the catalyst portion, (2) making lower the cell density of the catalyst portion, and (3) supporting a smaller amount of a catalyst layer on the catalyst portion, because these methods can allow the catalyst portion to have a larger open frontal area and consequently can endow the catalyst portion with a smaller heat capacity and a low pressure loss.

Figure 37:
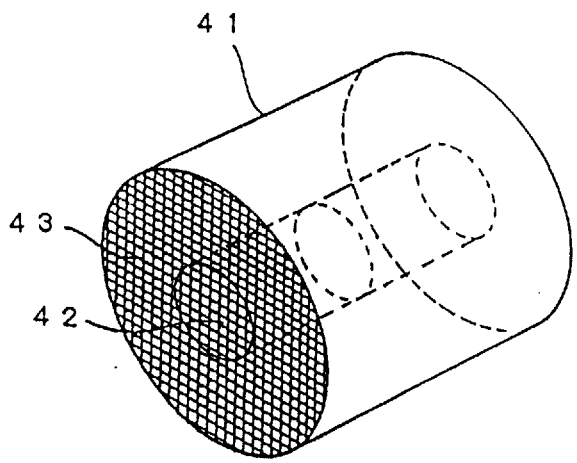
FIG. 37 is a drawing showing an adsorbent-catalyst used in the present system.
Figure 37:
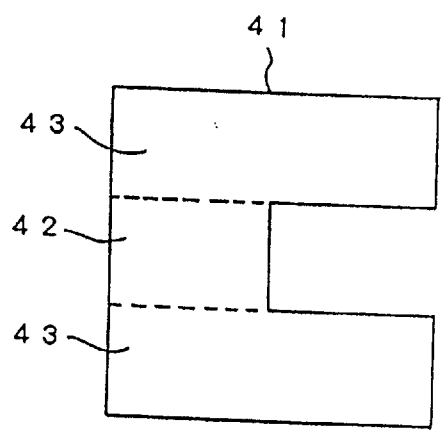

It is also preferable to make the length of at least part of the catalyst portion in the flow direction of exhaust gas, smaller than the length of the adsorbent portion in the same direction. Thereby, the heat capacity of the catalyst portion is made smaller; the pressure loss of the catalyst portion is made lower; a larger amount of an exhaust gas passes through the catalyst portion during the engine acceleration, and the catalyst portion is ignited at an early timing. Such a structure having a catalyst portion of smaller length can be obtained by supporting a catalyst layer only on part of the monolithic carrier portion other than the adsorbent portion, extending in the flow direction of exhaust gas. Such a structure can be obtained particularly preferably by, as shown in FIG. 37(a) (a perspective view) and FIG. 37(b) (a cross-sectional view), removing and making hollow part of a monolithic carrier 41 to make the length of the catalyst portion 42 in the flow direction of exhaust gas, smaller than the length of the adsorbent portion 43 in the same direction.

In the adsorbent-catalyst of the third invention, the catalyst portion and the adsorbent portion may be provided so that either one is not surrounded by the other, or either or both of the catalyst portion and the adsorbent portion may be provided at two or more places. It is also possible that the front end (gas inlet) or back end (gas outlet) of the adsorbent-catalyst or at least part of the cross sections of the adsorbent-catalyst perpendicular to the flow direction of exhaust gas is wholly or partially an adsorbent portion or a catalyst portion and that the adsorbent portion or the catalyst portion is not continuous in the flow direction of exhaust gas.

The system for exhaust gas purification according to the third invention is constituted by disposing the catalyst of low-temperature light-off performance and the adsorbent-catalyst in the exhaust pipe of internal combustion engine. The mechanism of exhaust gas purification using this system is the same as the above-mentioned mechanism of exhaust gas purification using the system for exhaust gas purification according to the first invention. In the system of the third invention as well, it is preferable that the adsorbent-catalyst is disposed upstream of the catalyst of low-temperature light-off performance in the flow path of exhaust gas, for the same reason as in the system of the first invention. In the third invention, it is possible that the adsorbent-catalyst and the catalyst of low-temperature light-off performance are formed in one monolithic carrier by supporting the catalyst layer of the catalyst of low-temperature light-off performance and the adsorbent layer and the catalyst layer of the adsorbent-catalyst on the different positions (for example, the upstream side and the downstream side) of one monolithic carrier. In this case also, it is preferable that the adsorbent-catalyst is present at the upstream side of the flow path of exhaust gas and the catalyst of low-temperature light-off performance is present at the downstream side of said path.

In the system of the third invention, the numbers of the catalyst of low-temperature light-off performance and the adsorbent-catalyst both disposed in an exhaust pipe may be each one, or at least one of them may be two or more. Other element, for example, an adsorbent as mentioned in the second invention may be disposed in combination with the catalyst and the adsorbent-catalyst. Preferably, these elements are combined appropriately and disposed continuously in the flow path of exhaust gas so that the HC, etc. generated during cold start can be purified efficiently.

In the system of the third invention, it is preferable that the adsorbent layer of at least either of the adsorbent-catalyst and the adsorbent contains a precious metal and an electron donor and/or nitrogen dioxide absorber, both such as contained in the catalyst layer of the catalyst of low-temperature light-off performance, or that the catalyst of low-temperature light-off performance is disposed downstream of the adsorbent-catalyst or the adsorbent.

Other catalyst(s) for exhaust gas purification may be disposed upstream and/or downstream of the adsorbent-catalyst and the catalyst of low-temperature light-off performance in the flow path of exhaust gas, or between the adsorbent-catalyst and the catalyst of low-temperature light-off performance. Preferably, the other catalyst(s) for exhaust gas purification as well contains (contain) a precious metal and an electron donor and/or nitrogen dioxide absorber, both such as contained in the catalyst layer of the catalyst of low-temperature light-off performance. The effects of the other catalyst(s) are the same as mentioned in the second invention. As in the second invention, it is preferable that at least one of the other catalysts for exhaust gas purification, disposed upstream and/or downstream of the system has a certain large volume relative to the engine displacement. In the system of the third invention, it is preferable that the individual elements are disposed in an exhaust pipe closely to each other so that the reaction heat generated in the catalyst of low-temperature light-off performance, etc. can be quickly transmitted to the other catalyst, etc. located downstream and thereby the light-off of the other catalyst, etc. can be promoted.

Next, description is made on the method for exhaust gas purification according to the fourth invention. This method purifies the harmful gases contained in an exhaust gas by using the system for exhaust gas purification according to any of the first to third inventions and by adding an oxidizing gas to an exhaust gas to be purified or controlling the amounts of air and fuel fed into engine so that the oxygen amount in exhaust gas is increased, for a certain length of time during engine cold start. In order to effectively reduce, by combustion, the HC generated in a large amount during cold start and adsorbed on and later desorbed from the adsorbent or the adsorbent-catalyst, it is necessary to allow the catalyst component contained in the catalyst composition of low-temperature light-off performance, the catalyst of low-temperature light-off performance, the adsorbent, etc. to cause light-off at an early timing. As a means for this early light-off, it is very effective to add an oxidizing gas to an exhaust gas to be purified or control the amounts of air and fuel fed into engine so that the oxygen amount in exhaust gas is increased, for a certain length of time during engine cold start. The oxidizing gas may be ozone ($O_3$), $O_2$, secondary air or the like. Of these, secondary air is most preferred because it can be introduced into an exhaust gas to be purified, by the use of a simple device such as air pump or the like.

The exhaust gas generated during cold start is generally a fuel-rich atmosphere and, when the HC adsorbed on the adsorbent or on the adsorbent portion of the adsorbent-catalyst is desorbed therefrom, becomes more fuel-rich temporarily. Hence, by adding an oxidizing gas to the exhaust gas or controlling the amounts of air and fuel fed into engine so that the oxygen amount in exhaust gas is increased, to increase the air fuel ratio of exhaust gas preferably to a stoichiometric (theoretical) air fuel ratio or a fuel-lean side, the reaction between combustible components and $O_2$ (or $O_3$, $O_2^-$ or the like) can be made more active. As a result, in the reaction mechanism based on the absorbability and releasability of $NO_2$, the light-off temperature of the reaction between combustible components and $O_2$ approaches the light-off temperature of the reaction between combustible components and $NO_2$, and the reaction heat generated in the reaction between combustible components and $NO_2$ can be utilized very effectively in the reaction between combustible components and $O_2$. In the reaction mechanism based on the donatability of electrons, since only the reaction between combustible components and $O_2$ takes place, the addition of oxidizing gas or the control of air fuel ratio is more effective for the improvement of purification ability.

In order to automatically conduct the introduction of oxidizing gas into exhaust gas or the control of amounts of air and fuel fed into engine, it is preferable to use a mechanism in which a detection means (e.g. $O_2$ sensor or HC sensor) capable of detecting the start of HC desorption from the HC-containing adsorbent, etc. is provided at least between the adsorbent, etc. and the downstream catalyst of low-temperature light-off performance, etc. to detect the desorption of HC and, based on the signal issued by the detection means, an oxidizing gas is introduced or the amounts of air and fuel fed are controlled.

The point of introduction of oxidizing gas (e.g. secondary air), when the number of the catalyst composition of low-temperature light-off performance of the first invention or the catalyst of low-temperature light-off performance of the second or third invention is two or more or when other catalyst(s) is (are) disposed besides them, is upstream of at least the most downstream catalyst composition or catalyst. Thereby, the catalyst or the like disposed downstream of the introduction point can effectively utilized (1) the reaction heat generated by the catalyst of low-temperature light-off performance, etc. disposed upstream of the introduction point and (2) the introduced oxidizing gas, and the reaction between combustible components and $O_2$ can be promoted. Introduction of oxidizing gas upstream of the catalyst composition of low-temperature light-off performance or the catalyst of low-temperature light-off performance is preferred because said catalyst composition or catalyst can very effectively utilize the reaction heat generated by the catalyst composition or catalyst, and not only the reaction between combustible components and $NO_2$ but also the reaction between combustible components and $O_2$ can be promoted. The number of the device for introduction of oxidizing gas may be more than one and they may be provided at different positions. A plurality of the devices may be operated independently or jointly. The amount of oxidizing gas introduced may be fixed or appropriately varied.

The present invention is hereinafter described in more detail by way of Examples. However, the present invention is not restricted to these Examples.
{Production of catalysts of low-temperature light-off performance and evaluation of their performances}

Catalysts were produced according to the following procedure and measured for their performances.
[Effect of production method of catalyst on its performance]

(Catalyst A)

Commercial $\gamma$-$Al_2O_3$ was impregnated with an aqueous barium nitrate solution, followed by calcination at 700° C. for 3 hours, to obtain a barium oxide-alumina compound oxide. The oxide was disintegrated to obtain a barium oxide-alumina compound oxide powder (hereinafter referred to as "compound oxide $\alpha$"). To the compound oxide $\alpha$ were added an aqueous palladium nitrate solution and an apropriate amount of acetic acid, and the mixture was disintegrated in a ball mill for 15 hours. The resulting slurry was dried at 100° C. for 15 hours, followed by firing at 550° C. for 3 hours, to obtain a Pd/BaO-predoped $Al_2O_3$ powder. This powder was mixed with an appropriate amount of water. To the mixture were added an appropriate amount of acetic acid and an alumina sol having an alumina solid content of 2.5%, and they were disintegrated in a ball mill for 15 hours to prepare a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$, BaO=0.025 g/cc and $Al_2O_3$=0.10 g/cc. The coated carrier was dried and fired to obtain catalyst A. The outline of the above procedure is shown in FIG. 1.
(Catalyst B)

Figure 2:
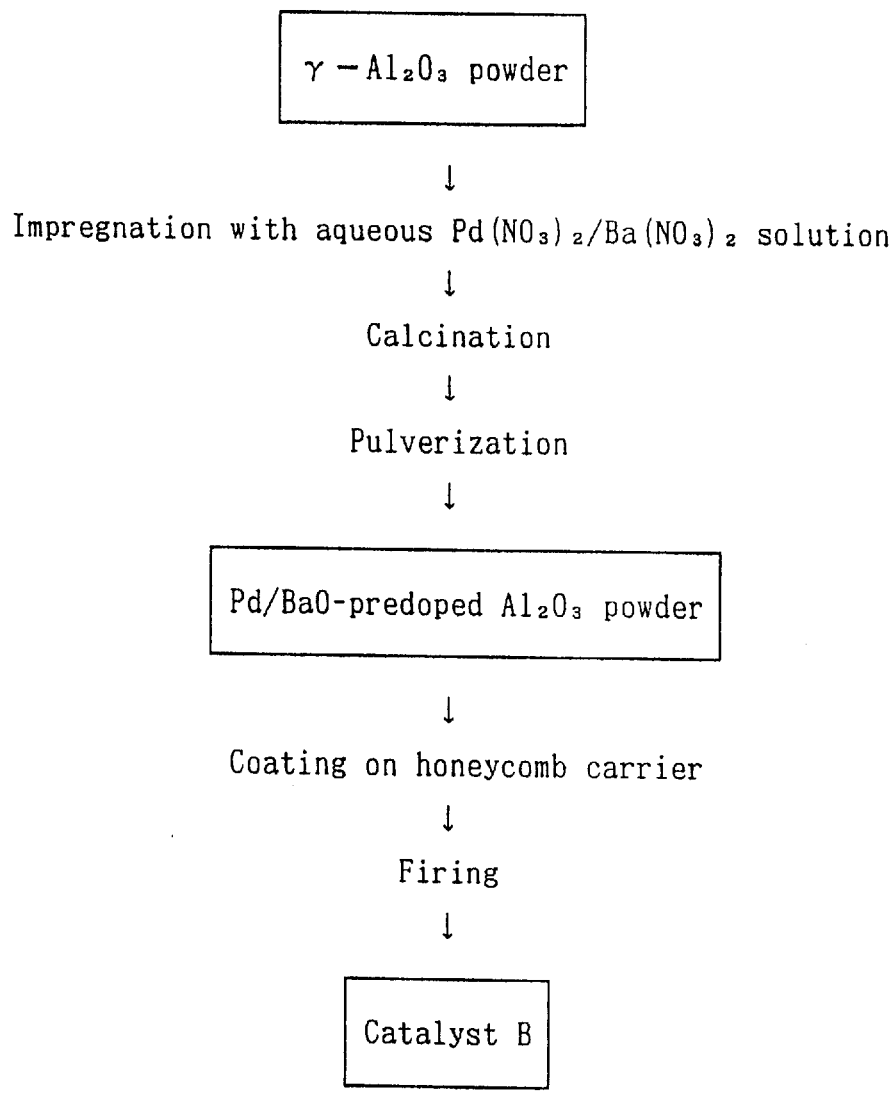
FIG. 2 is a schematic drawing showing the preparation steps of a catalyst used in the present system.

Commercial $\gamma$-$Al_2O_3$ was mixed with a mixture of an aqueous barium nitrate solution and an aqueous palladium nitrate solution. The resulting mixture was calcinated at 700° C. for 3 hours to obtain a Pd/BaO-predoped $Al_2O_3$ compound oxide. The oxide was disintegrated and mixed with an appropriate amount of water. To the mixture were added an appropriate amount of acetic acid and an alumina sol having an alumina solid content of 2.5%, and they were disintegrated in a ball mil for 15 hours to prepare a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$, BaO=0.025 g/cc and $Al_2O_3$=0.10 g/cc. The coated carrier was dried and fired to obtain catalyst B. The outline of the above procedure is shown in FIG. 2.
(Catalyst C)

Figure 3:
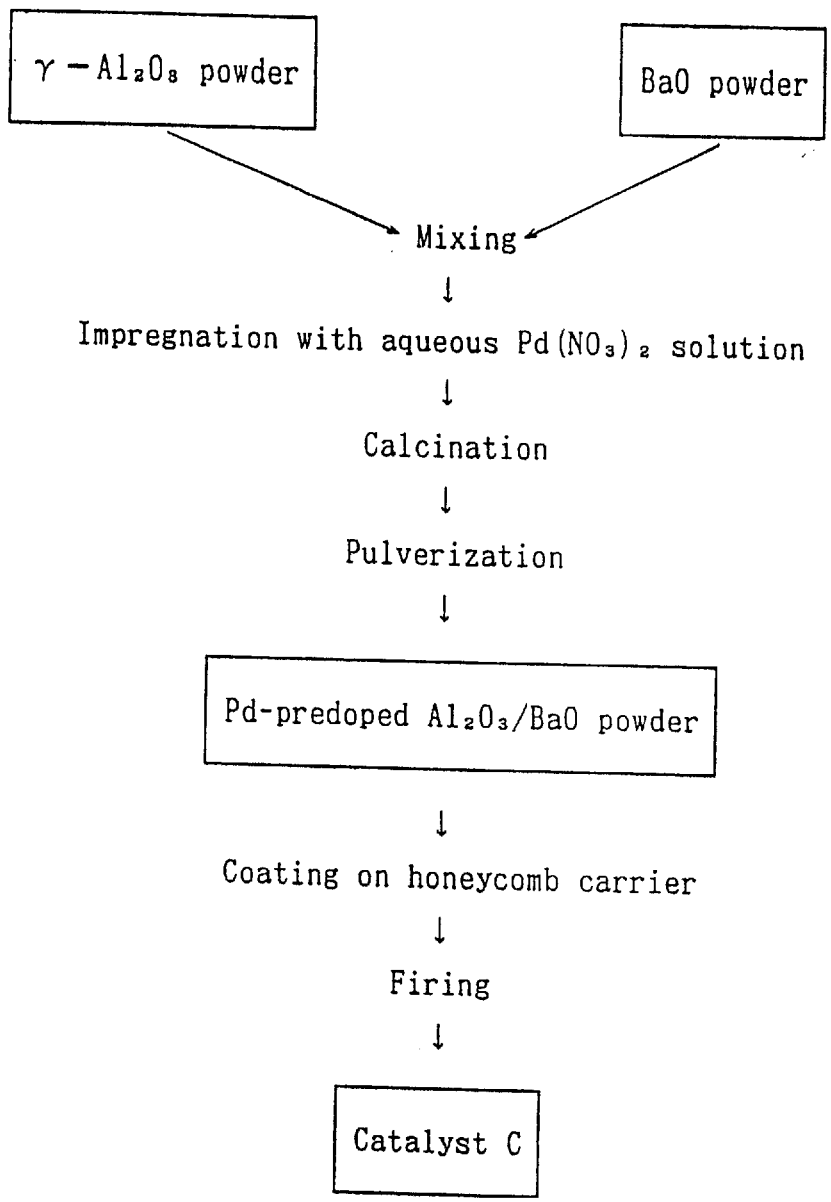
FIG. 3 is a schematic drawing showing the preparation steps of a catalyst used in the present system.

A mixture of commercial $\gamma$-$Al_2O_3$ and barium oxide particles was impregnated with an aqueous palladium nitrate solution, followed by firing at 550° C. for 3 hours, to obtain a Pd-predoped $Al_2O_3$/BaO compound oxide. The oxide was disintegrated to obtain a Pd-predoped $Al_2O_3$/BaO compound oxide powder. This powder was mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$, BaO=0.025 g/cc and $Al_2O_3$=0.10 g/cc. The coated carrier was dried and fired to obtain catalyst C. The outline of the above procedure is shown in FIG. 3.
(Catalyst D)

Figure 4:
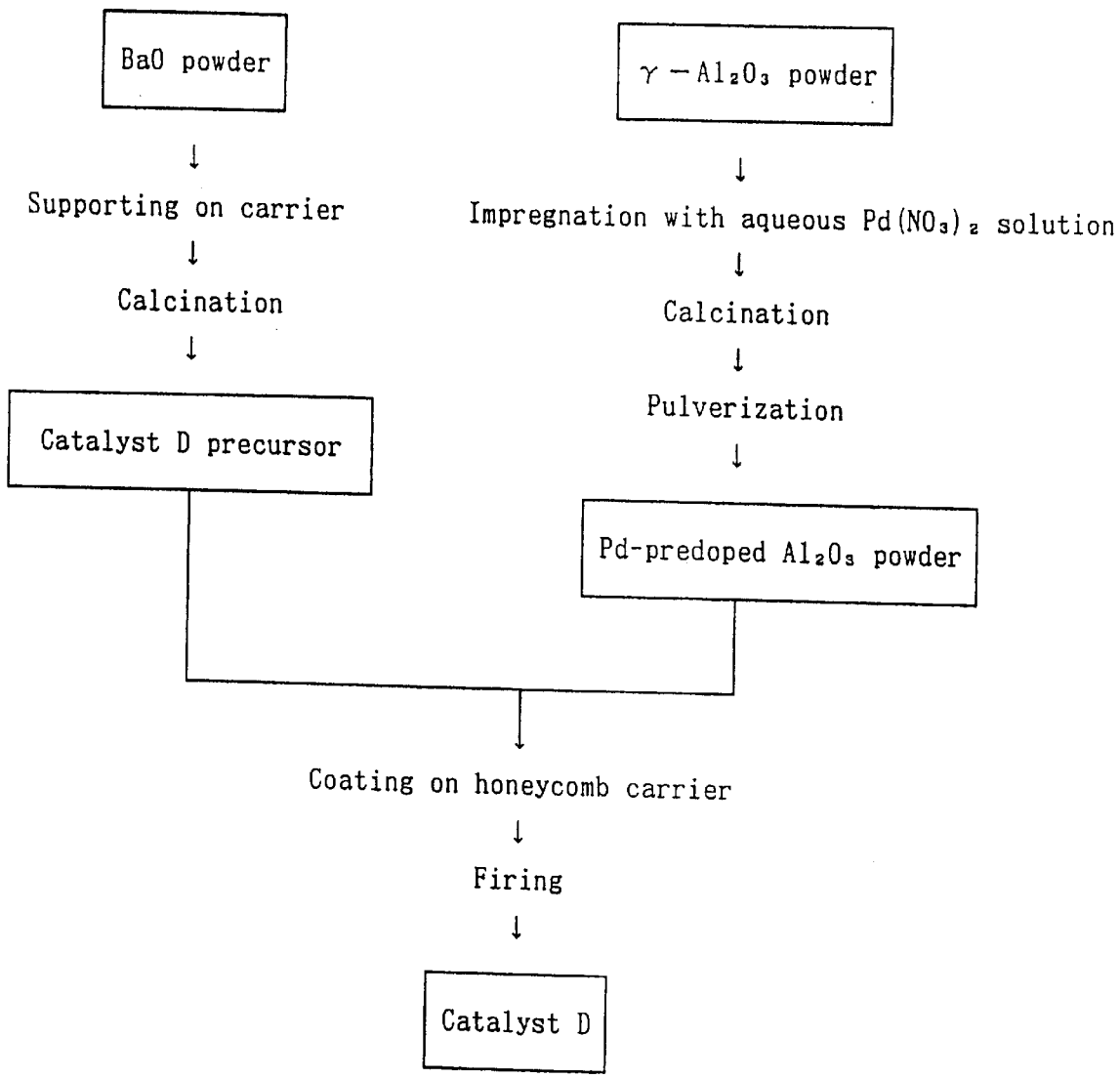
FIG. 4 is a schematic drawing showing the preparation steps of a catalyst used in the present system.

Barium oxide particles were mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) to coat the carrier. The coated carrier was dried and fired to obtain an catalyst D precursor. Next, a commercial γ-Al$_2$O$_3$ powder was mixed with an aqueous palladium nitrate solution and an appropriate amount of acetic acid, and they were disintegrated for 15 hours in a ball mill. The resulting slurry was dried at 100° C. for 15 hours, disintegrated, and fired at 550° C. for 3 hours to obtain a Pd-predoped Al$_2$O$_3$ powder (hereinafter referred to as "compound oxide β"). The powder was mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped the catalyst D precursor so that the catalyst D precursor was coated in amounts of Pd=200 g/ft$^3$, BaO=0.025 g/cc and Al$_2$O$_3$=0.10 g/cc. The coated material was dried and fired to obtain catalyst D. The outline of the above procedure is shown in FIG. 4.

(Catalyst E)

Figure 5:
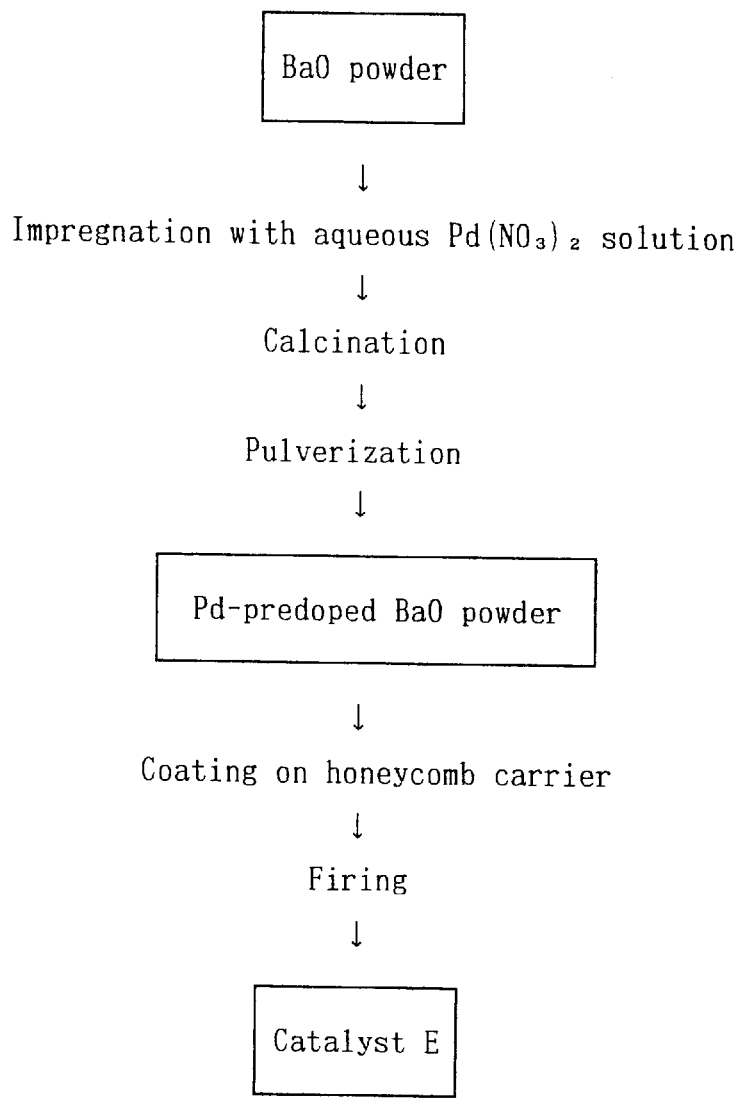
FIG. 5 is a schematic drawing showing the preparation steps of a catalyst used in the present system.

Barium oxide particles were mixed with an aqueous palladium nitrate solution, and the mixture was calcinated at 550° C. for 3 hours to obtain a Pd-predoped BaO compound oxide. The oxide was disintegrated and mixed with an appropriate amount of water. Thereto were added an appropriate amount of acetic acid and alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$ and BaO=0.025 g/cc. The coated carrier was dried and fired to obtain catalyst E. The outline of the above procedure is shown in FIG. 5.

(Catalyst F)

Figure 6:
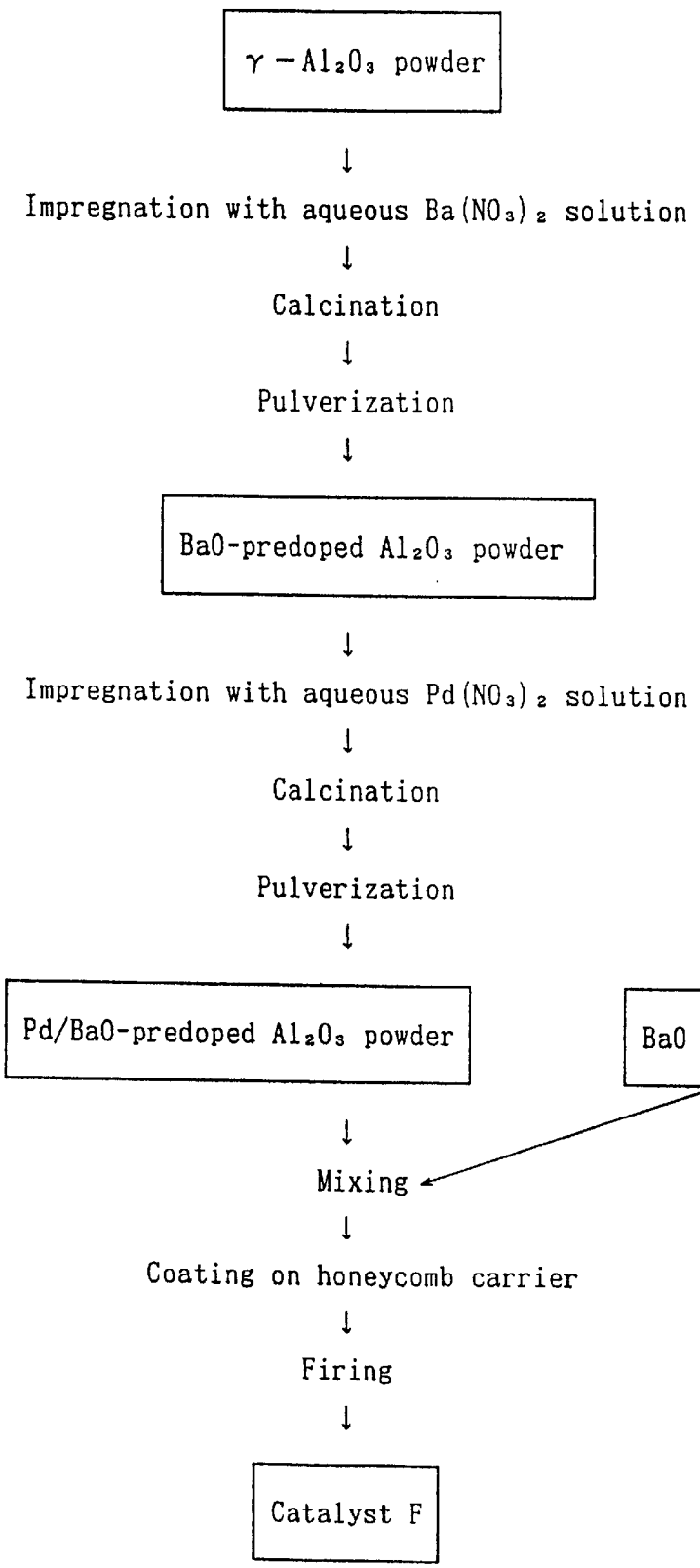
FIG. 6 is a schematic drawing showing the preparation steps of a catalyst used in the present system.

Commercial γ-Al$_2$O$_3$ was impregnated with an aqueous barium nitrate solution and calcinated at 700° C. for 3 hours to obtain a barium oxide/alumina compound oxide. The oxide was disintegrated to obtain a barium oxide/alumina compound oxide powder. To the powder were added an aqueous palladium nitrate solution and an appropriate amount of acetic acid, and they were disintegrated for 15 hours in a ball mill. The resulting slurry was dried at 100° C. for 15 hours and fired at 550° C. for 3 hours to obtain a Pd/BaO-predoped Al$_2$O$_3$ powder. The powder was mixed with an appropriate amount of water and a barium oxide powder. To the mixture were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$, BaO=0.025 g/cc and Al$_2$O$_3$=0.10 g/cc. The coated carrier was dried and fired to obtain catalyst F. The outline of the above procedure is shown in FIG. 6.

(Catalyst G)

Figure 7:
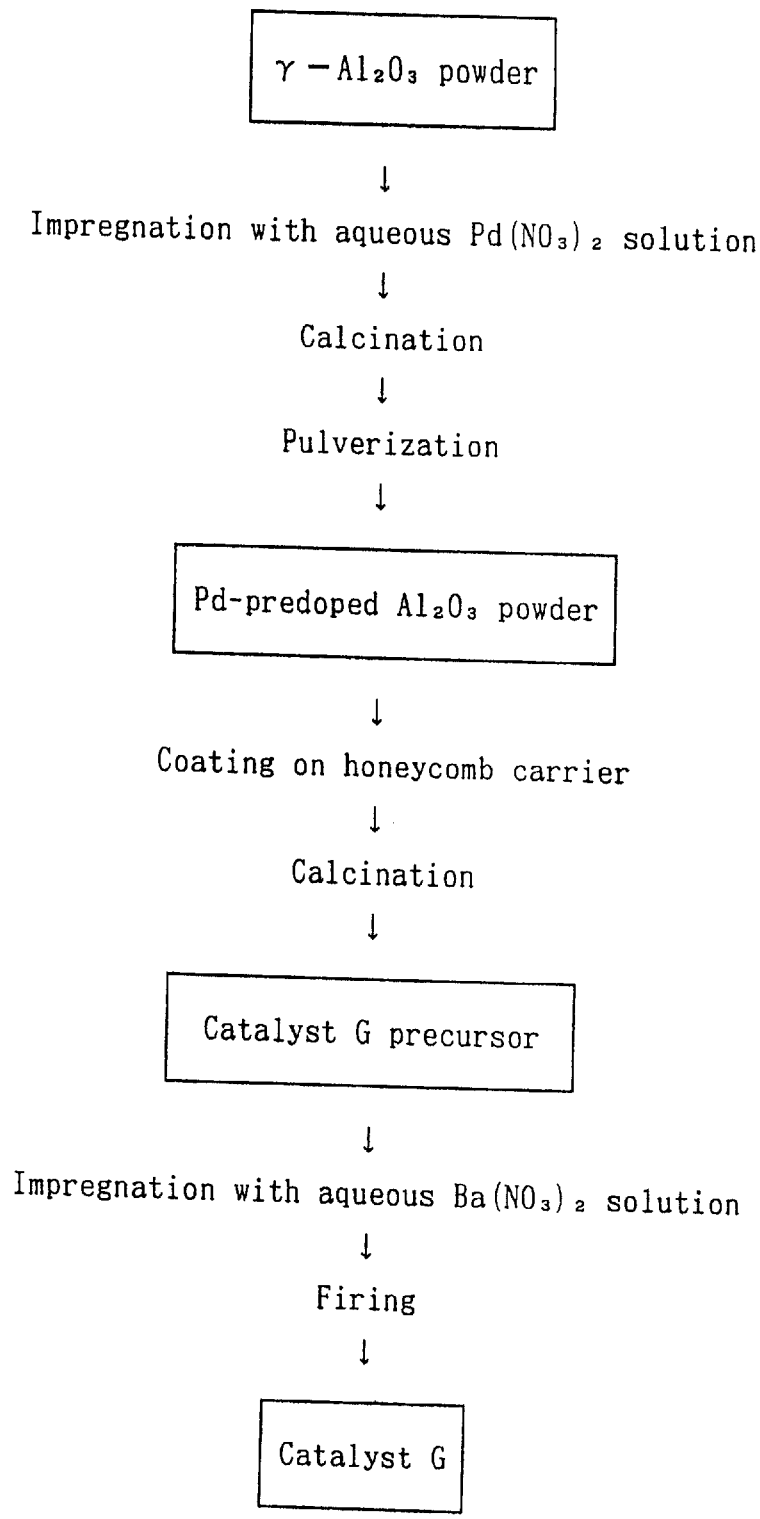
FIG. 7 is a schematic drawing showing the preparation steps of a catalyst used in the present system.

Commercial γ-Al$_2$O$_3$ was impregnated with an aqueous palladium nitrate solution and fired at 550° C. for 3 hours to obtain Pd-predoped Al$_2$O$_3$. The Pd-predoped Al$_2$O$_3$ was disintegrated and mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) to coat the carrier. The coated carrier was dried and fired to obtain an catalyst G precursor. The catalyst G precursor was impregnated with an aqueous barium nitate solution and fired at 700° C. for 3 hours to obtain catalyst G which contained Pd=200 g/ft$^3$, BaO=0.025 g/cc and Al$_2$O$_3$=0.10 g/cc. The outline of the above procedure is shown in FIG. 7.

(Catalyst H)

Figure 8:
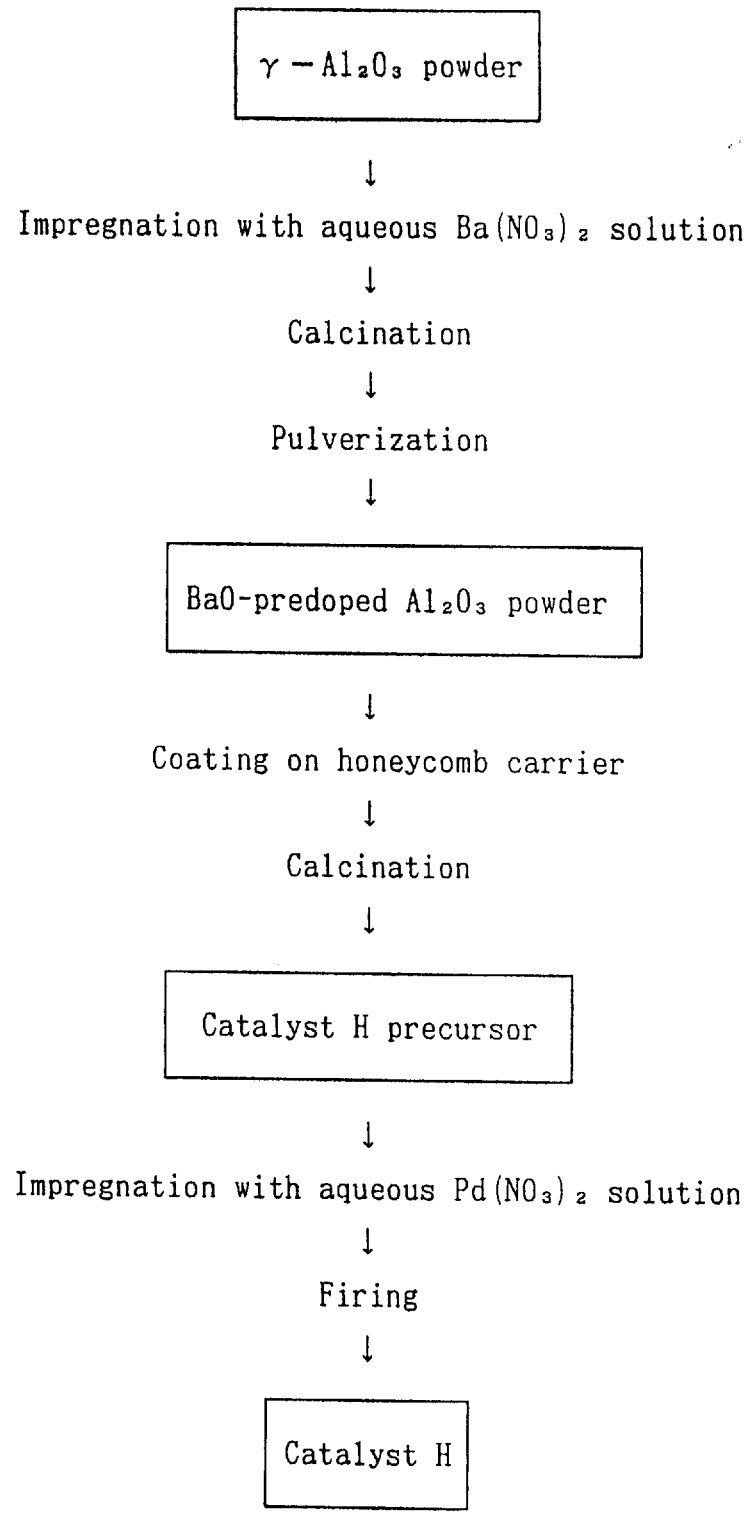
FIG. 8 is a schematic drawing showing the preparation steps of a catalyst used in the present system.

The compound oxide a mentioned with respect to the production of catlayst A was mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) to coat the carrier. The coated carrier was dried and fired to obtain an catalyst H precursor. The catalyst H precursor was impregnated with an aqueous palladium nitate solution and fired at 550° C. for 1 hour to obtain catalyst H which contained Pd=200 g/ft$^3$, BaO=0.025 g/cc and Al$_2$O$_3$=0.10 g/cc. The outline of the above procedure is shown in FIG. 8.

(Catalyst I)

Figure 9:
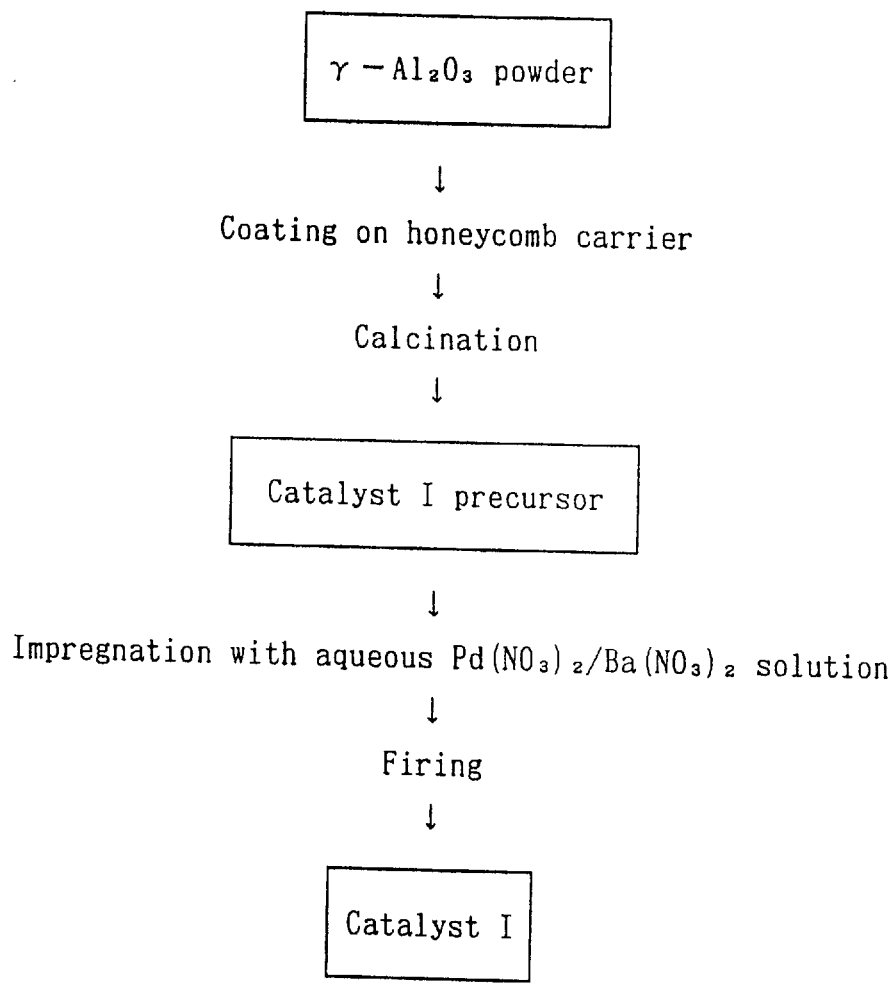
FIG. 9 is a schematic drawing showing the preparation steps of a catalyst used in the present system.

Commercial γ-Al$_2$O$_3$ was mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) to coat the carrier. The coated carrier was dried and fired to obtain an catalyst I precursor. The catalyst I precursor was impregnated with a mixture of an aqueous barium nitrate solution and an aqueous palladium nitate solution and fired at 700° C. for 3 hours to obtain catalyst I which contained Pd=200 g/ft$^3$, BaO=0.025 g/cc and Al$_2$O$_3$=0.10 g/cc. The outline of the above procedure is shown in FIG. 9.

(Catalyst J)

To a barium oxide powder were added an aqueous palladium nitrate solution and an appropriate amount of acetic acid, and they were disintegrated for 15 hours in a ball mill. The resulting slurry was dried at 100° C. for 15 hours and fired at 550° C. for 3 hours to obtain a Pd-predoped BaO powder. The powder was mixed with an appropriate amount of water and the compound oxide α mentioned with respect to the production of catalyst A. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$, BaO=0.025 g/cc and Al$_2$O$_3$=0.10 g/cc. The coated carrier was dried and fired to obtain catalyst J. The outline of the above procedure is shown in FIG. 10.

(Catalyst K)

Figure 11:
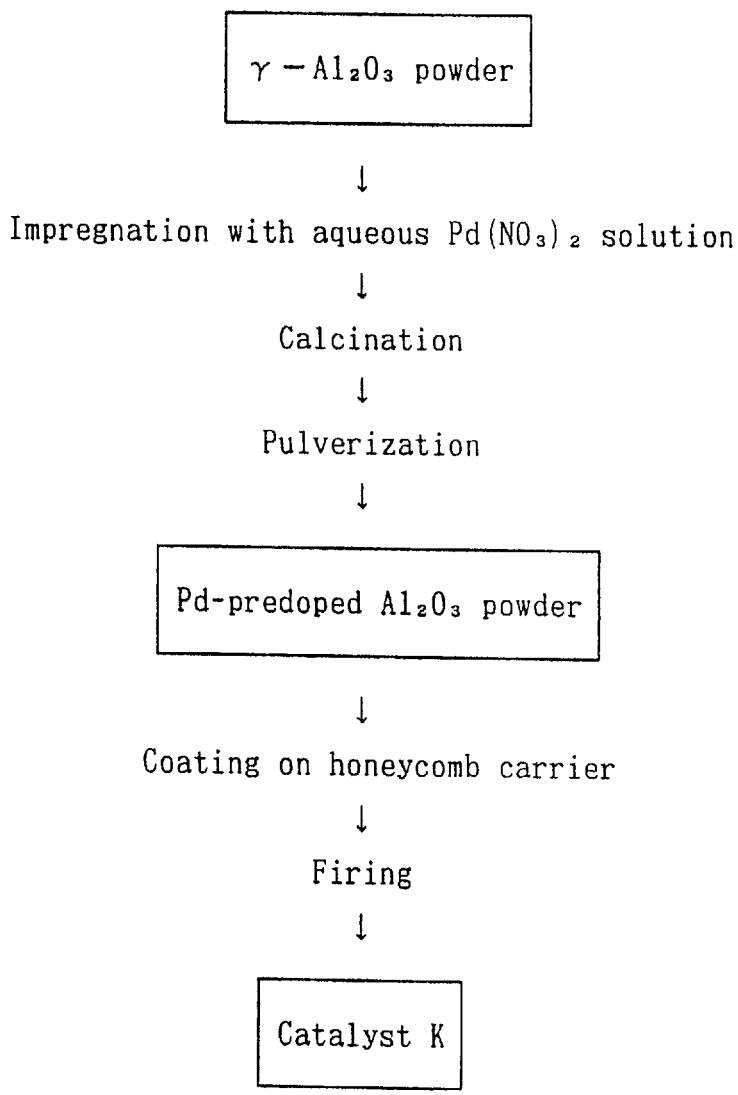
FIG. 11 is a schematic drawing showing the preparation steps of a catalyst used in the present system.

To commercial γ-Al$_2$O$_3$ were added an aqueous palladium nitrate solution and an appropriate amount of acetic acid, and they were disintegrated for 15 hours in a ball mill. The resulting slurry was dried at 100° C. for 15 hours and fired at 550° C. for 3 hours to obtain a Pd-predoped Al$_2$O$_3$ powder. The powder was mixed with an appropriate amount of water. Thereto were added an appropriate amount of acetic acid and an alumina sol having an alumina solid content of 2.5%, and they were disintegrated for 15 hours in a ball mill to obtain a slurry. In the slurry was dipped a monolithic carrier (a cordierite honeycomb manufactured by NGK Insulators, Inc., having a diameter of 93 mm and a length of 100 mm) so that the carrier was coated in amounts of Pd=200 g/ft$^3$ and Al$_2$O$_3$=0.10 g/cc. The coated carrier was dried and fired to obtain catalyst K. The outline of the above procedure is shown in FIG. 11.

(Measurement of light-off temperatures of catalysts A to K)

Figure 12:
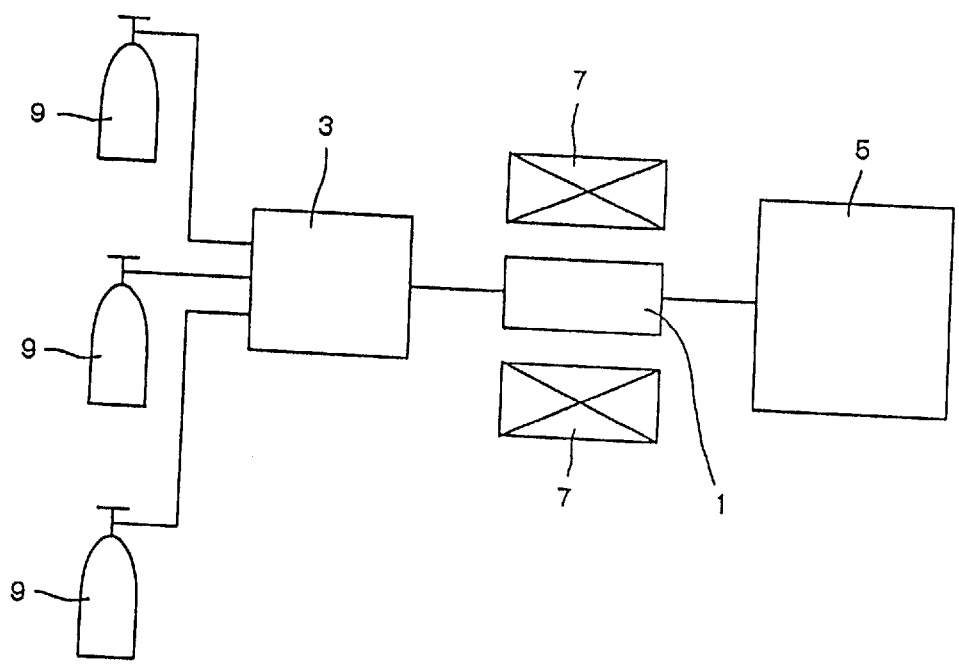
FIG. 12 is a schematic drawing showing the light-off temperature tester used in the present invention.

The catalysts obtained above were measured for HC light-off performance according to the following method, i.e. a method wherein a synthetic exhaust gas simulating an exhaust gas generated during cold start, which had a fuel-rich composition ($\lambda$=0.95) as shown in Table 1, was passed through a catalyst and the temperature of the catalyst, at which the conversion of the HC components in the exhaust gas became 50%, was measured and taken as the light-off temperature of the catalyst (this method is hereinafter referred to as "the method 1"). First, each catalyst obtained was measured for light-off temperature by the method 1. Then, the catalyst was exposed, for aging, to an exhaust gas of 750° C. discharged from an actual engine, in a fuel-cut mode for a total of 100 hours (this operation is hereinafter referred to as "750° C.×100 hours aging"). Thereafter, the catalyst was again measured for light-off temperature by the method 1, and the result is shown in Table 2 (Examples 1–10 and Comparative Example 1). Incidentally, the testing apparatus used is shown in FIG. 12. In FIG. 12, 1 is a catalyst to be tested; 9 is a gas bomb containing a component for synthetic exhaust gas; 3 is a gas mixer for preparation of a synthetic exhaust gas of desired composition; 7 is an electric furnace; and 5 is a gas analyzer. As shown in Table 2, the catalysts A to J each containing a nitrogen dioxide absorber, which were produced in various ways, showed light-off temperatures lower than that of the catalyst K containing no nitrogen dioxide absorber. The catalysts A and F were particularly superior in view of the light-off performances and durabilities. Close disposition of precious metal and nitrogen dioxide absorber gave a higher light-off performance; predoping gave a higher durability than impregnation; and use of at least part of nitrogen dioxide absorber for predoping of Al$_2$O$_3$ gave a better result.

TABLE 1

Synthetic Exhaust Gas

| Component | Concentration |
|---|---|
| N$_2$ | Balance |
| CO$_2$ | 13.0% |
| O$_2$ | 0.9% |
| CO | 2.5% |
| H$_2$ | 0.9% |
| HC | 3300 ppm C |
| NO | 1400 ppm |
| SO$_2$ | 20 ppm |
| H$_2$O | 10% |

TABLE 2

| | Catalyst | Light-off temp. (°C.) |
|---|---|---|
| Example 1 | A | 264 |
| Example 2 | B | 267 |
| Example 3 | C | 266 |
| Example 4 | D | 272 |
| Example 5 | E | 274 |
| Example 6 | F | 264 |
| Example 7 | G | 267 |
| Example 8 | H | 267 |
| Example 9 | I | 272 |
| Example 10 | J | 270 |

TABLE 2-continued

| | Catalyst | Light-off temp. (°C.) |
|---|---|---|
| Comparative Example 1 | K | 296 |

[Effect of kind of precious metal on catalyst performance]

Next, the effect of kind of precious metal on performance of catalyst was examined. To produce catalysts used for this purpose, an alumina powder was predoped with precious metals, etc. and each of the resulting materials was washcoated on a carrier, based on the production method used for catalyst A which gave particularly superior results in light-off performance and durability as shown in Table 2.

Catalysts of various precious metal/nitrogen dioxide absorber combinations as shown in Table 3 were produced based on the production method used for catalyst A except that palladium nitrate was replaced by platinum chloride or palladium nitrate/platinum chloride and that barium nitate was replaced by magnesium nitrate, cerium nitate, lanthanum nitrate or zirconyl nitrate. When both platinum and palladium were used as the precious metal, Pd/nitrogen dioxide absorber-predoped Al$_2$O$_3$ and Pt/nitrogen dioxide absorber-predoped Al$_2$O$_3$ were separately prepared and then mixed, and the mixture was supported on a honeycomb carrier. For comparison, catalysts containing no nitrogen dioxide absorber were produced based on the production method used for catalyst K, using platinum chloride or palladium nitrate/platinum chloride in place of palladium nitrate. The catalysts produced were subjected to 750° C.×100 hours aging and then measured for light-off temperature by the method 1. The results (Examples 10–24 and Comparative Examples 2–4) are shown in Table 3. As is clear from Table 3, use of both platinum and palladium as precious metal is preferred.

TABLE 3

| | Kind of precious metal | Kind of NO$_2$ absorber | Light-off temp. (°C.) |
|---|---|---|---|
| Example 10 | Pd(200 g/ft$^3$) | Ba | 264 |
| Example 11 | Pt(200 g/ft$^3$) | Ba | 361 |
| Example 12 | Pd(150 g/ft$^3$), Pt(50 g/ft$^3$) | Ba | 184 |
| Example 13 | Pd(200 g/ft$^3$) | Mg | 264 |
| Example 14 | Pt(200 g/ft$^3$) | Mg | 352 |
| Example 15 | Pd(150 g/ft$^3$), Pt(50 g/ft$^3$) | Mg | 182 |
| Example 16 | Pd(200 g/ft$^2$) | Cs | 264 |
| Example 17 | Pt(200 g/ft$^3$) | Cs | 420 |
| Example 18 | Pd(150 g/ft$^3$), Pt(50 g/ft$^3$) | Cs | 197 |
| Example 19 | Pd(200 g/ft$^3$) | La | 266 |
| Example 20 | Pt(200 g/ft$^3$) | La | 357 |
| Example 21 | Pd(150 g/ft$^3$), Pt(50 g/ft$^3$) | La | 183 |
| Example 22 | Pd(200 g/ft$^3$) | Zr | 274 |
| Example 23 | Pt(200 g/ft$^3$) | Zr | 350 |
| Example 24 | Pd(150 g/ft$^3$), Pt(50 g/ft$^3$) | Zr | 182 |
| Comparative Example 2 | Pd(200 g/ft$^3$) | Not used | 296 |
| Comparative Example 3 | Pt(200 g/ft$^3$) | Not used | 443 |
| Comparative Example 4 | Pd(150 g/ft$^3$), Pt(50 g/ft$^3$) | Not used | 299 |

[Effect of NO$_2$ absorber on catalyst performance]

Catalysts each containing Pt=50 g/ft$^3$, Pd=150 g/ft$^3$, nitrogen dioxide absorber=0.025 g/cc and Al$_2$O$_3$=0.10 g/cc were produced based on the production method used for catalyst A except that platinum and palladium were used as the precious metal and that barium nitrate was replaced by lithium nitrate, cesium nitrate, magnesium nitrate, calcium nitrate, strontium nitrate, yttrium nitrate, zirconyl nitrate, lanthanum nitrate, thorium nitrate, cadmium nitrate and potassium nitrate. Further, catalysts each containing Pt=50 g/ft$^3$, Pd=150 g/ft$^3$, nitrogen dioxide absorber=0.025 g/cc and Al$_2$O$_3$=0.10 g/cc were produced based on the production method used for catalyst C except that platinum and palladium were used as the precious metal and that barium nitrate was replaced by hafnium oxide or YBa$_2$Cu$_3$O$_7$. Furthermore, a catalyst containing Pt=50 g/ft$^3$, Pd=150 g/ft$^3$ and Al$_2$O$_3$=0.10 g/cc but containing no nitrogen dioxide absorber was produced based on the production method used for catalyst K except that palladium nitrate was replaced by palladium nitrate and platinum chloride. All of these catalysts were subjected to 750° C.×100 hours aging and then measured for light-off temperatures by the methods 1, 2 and 3 (the methods 2 and 3 are described below). The reuslts (Examples 25–42 and Comparative Examples 5–6) are shown in Table 4. As is clear from Table 4, each of the catalysts containing a nitrogen dioxide absorber showed a light-off temperature lower than that of the catalyst containing no NO$_2$ absorber. The light-off temperatures by the method 2 were inferior to those by the methods 1 and 3. This is presumed to be because, in the method 2, each substance used in each catalyst as an NO$_2$ absorber reduced the light-off temperature of catalyst based mainly on the electron donatability to precious metal, rather than on the NO$_2$ absorbability and releasability. It is presumed that the significant reduction in light-off temperature in both the method 1 and the method 3 was made possible by NO$_2$. It is appreciated that Mg, Ba, Zr, La, Cs, YBa$_2$Cu$_3$O$_7$, etc. are preferable as NO$_2$ absorber.

(Method 2)

A synthetic exhaust gas having a fuel-rich composition of relatively low NO concentration as shown in Table 5 was passed through a catalyst; and the temperature at which the conversion of the HC components in the exhaust gas became 50%, was measured and taken as the light-off temperature of the catalyst.

(Method 3)

A synthetic exhaust gas simultating an exhaust gas of theoretical air fuel ratio (λ=1.00), which had a composition as shown in Table 6, was pased through a catalyst at 400° C. for 30 minutes. Then, the catalyst was allowed to cool to room temperature. Thereafter, through the catalyst was passed a synthetic exhaust gas simulating an exhaust gas generated during cold start, which had a fuel-rich composition (λ=0.95) as shown in Table 5; and the temperature at which the conversion of the HC components in the exhaust gas became 50%, was measured and taken as the light-off temperature of the catalyst.

TABLE 4

|  | Kind of precious metal | Kind of absorber | Light-off temp. (°C.) | | |
|---|---|---|---|---|---|
|  |  |  | Method 1 | Method 2 | Method 3 |
| Example 25 | Pt,Pd | Li | 297 | 305 | 295 |
| Example 26 | Pt,Pd | Cs | 197 | 272 | 192 |
| Example 27 | Pt,Pd | Mg | 182 | 267 | 182 |
| Example 28 | Pt,Pd | Ca | 298 | 308 | 296 |
| Example 29 | Pt,Pd | Sr | 204 | 294 | 211 |
| Example 30 | Pt,Pd | Ba | 184 | 271 | 185 |
| Example 31 | Pt,Pd | Y | 211 | 287 | 214 |
| Example 32 | Pt,Pd | Zr | 182 | 278 | 182 |
| Example 33 | Pt,Pd | Hf | 197 | 289 | 208 |
| Example 34 | Pt,Pd | La | 183 | 272 | 181 |
| Example 35 | Pt,Pd | Ce | 241 | 296 | 250 |
| Example 36 | Pt,Pd | Th | 239 | 294 | 234 |

TABLE 4-continued

|  | Kind of precious metal | Kind of absorber | Light-off temp. (°C.) | | |
|---|---|---|---|---|---|
|  |  |  | Method 1 | Method 2 | Method 3 |
| Example 37 | Pt,Pd | YBa$_2$Cu$_3$O$_7$ | 182 | 284 | 181 |
| Example 38 | Pt,Pd | K | 297 | 306 | 291 |
| Example 39 | Pt,Pd | Zr,Ba | 187 | 278 | 183 |
| Example 40 | Pt,Pd | Cs,La | 186 | 269 | 185 |
| Example 41 | Pt,Pd | Ca,Li | 297 | 306 | 295 |
| Example 42 | Pt,Pd | Ba,Mg | 184 | 268 | 182 |
| Comparative Example 5 | Pt,Pd | Not used | 299 | 309 | 299 |
| Comparative Example 6 | Pt,Pd | Cd | 303 | 304 | 304 |

TABLE 5

Synthetic Exhaust Gas

| Component | Concentration |
|---|---|
| N$_2$ | Balance |
| CO$_2$ | 13.0% |
| O$_2$ | 0.9% |
| CO | 2.5% |
| H$_2$ | 0.9% |
| HC | 3300 ppm C |
| NO | 500 ppm |
| SO$_2$ | 20 ppm |
| H$_2$O | 10% |

TABLE 6

Synthetic Exhaust Gas

| Component | Concentration |
|---|---|
| N$_2$ | Balance |
| CO$_2$ | 13.0% |
| O$_2$ | 0.8% |
| CO | 0.7% |
| H$_2$ | 0.2% |
| HC | 2800 ppm C |
| NO | 1100 ppm |
| SO$_2$ | 20 ppm |
| H$_2$O | 10% |

[Effect of amounts of supported catalyst components on catalyst performance]

Catalysts containing γ-Al$_2$O$_3$ predoped with platinum and palladium (precious metals) and also predoped with barium oxide (NO$_2$ absorber) were produced based on the production method used for catalyst A. In these catalysts, the total amount of precious metals supported and the amount of barium oxide supported were varied as shown in Table 7. For comparison, a catalyst containing no NO$_2$ absorber was produced based on the production method used for catalyst K except that palladium nitrate was replaced by palladium nitrate and platinum chloride. All of these catalysts were subjected to 750° C.×100 hours aging and then measured for light-off temperatures by the method 1. The results (Examples 44–50 and Comparative Example 7) are shown in Table 7. As is clear from Table 7, the catalysts of Examples 44–50 each containing barium oxide as the NO$_2$ absorber showed light-off temperatures lower than that of the catalyst of Comparative Example 7 containing no NO$_2$ absorber. When the total amount of precious metals supported was 200 g/ft$^3$, the catalyst containing 0.025 g/cc of barium oxide gave the best result. This is presumed to be because the amount (0.025 g/cc) of the barium oxide supported on a monolithic carrier in the form of BaO-predoped γ-$Al_2O_3$ was sufficient for $NO_2$ absorption and, moreover, was appropriate for effective utilization of the high specific surface area of γ-$Al_2O_3$. When the amount of $NO_2$ absorber supported was 0.025 g/cc, the catalyst containing a total amount of precious metals of 200 g/ft³ gave the best result. From the above result, it is presumed that too small a total amount of precious metals gives no sufficient effect and too large a total amount of precious metals causes cohesion and reduced dispersion.

TABLE 7

|  | Total amount of precious metals (g/ft³) | Amount of $NO_2$ absorber (g/cc) | Light-off temp. (°C.) |
| --- | --- | --- | --- |
| Example 44 | 200 | 0.025 | 184 |
| Example 45 | 200 | 0.005 | 289 |
| Example 46 | 200 | 0.010 | 233 |
| Example 47 | 200 | 0.250 | 228 |
| Example 48 | 200 | 0.400 | 246 |
| Example 49 | 30 | 0.025 | 250 |
| Example 50 | 500 | 0.025 | 185 |
| Comparative Example 7 | 200 | 0 | 299 |

[Effect of disposition of catalyst components on catalyst performance]

The following catalysts L to T were produced to examine the effect of disposition of precious metals and $NO_2$ absorber on catalyst performance, and were measured for light-off performances.

(Catalyst L)

To the compound oxide a mentioned with respect to the production of catlayst A were added an aqueous palladium nitrate solution and an appropriate amount of actic acid, and they were disintegrated for 15 hours in a ball mill. The resulting slurry was dried at 100° C. for 15 hours and fired at 550° C. for 3 hours to obtain a Pd/BaO-predoped $Al_2O_3$ powder. Separately, to the compound oxide α were added an aqueous dinitrodiammineplatinum solution and an appropriate amount of acetic acid, and they were disintegrated for 15 hours in a ball mill. The resulting slurry was dried at 100° C. for 15 hours and fired at 550° C. for 3 hours to obtain a Pt/BaO-predoped $Al_2O_3$ powder. The Pd/BaO-predoped $Al_2O_3$ powder, the Pt/BaO-predoped $Al_2O_3$ powder and an appropriate amount of water were mixed. Thereto were added an appropriate amount of acetic acid and an alumina sol having an alumina solid content of 2.5%, and they were disintegrated for 15 hours in a ball mill to prepare a slurry. In the slurry was dipped a monolithic carrier (a cordierite honeycomb manufactured by NGK Insulators, Inc., having a diameter of 93 mm and a length of 100 mm) so that the carrier was coated in amounts of Pt=50 g/ft³, Pd=150 g/ft³, BaO=0.025 g/cc and $Al_2O_3$=0.10 g/cc. The coated carrier was dried and fired to obtain catalyst L.

(Catalyst M)

Pt-predoped $Al_2O_3$ and Pd/BaO-predoped $Al_2O_3$ were supported on a monolithic carrier (a cordierite honeycomb manufactured by NGK Insulators, Inc., having a diameter of 93 mm and a length of 100 mm) at the upstream (in the flow direction of exhaust gas) side of the carrier and the downstream side, respectively, to obtain catalyst M containing Pt=50 g/ft³, Pd=150 g/ft³, BaO=0.025 g/cc and $Al_2O_3$=0.10 g/cc.

(Catalyst N)

Pt/BaO-predoped $Al_2O_3$ and Pd-predoped $Al_2O_3$ were supported on a monolithic carrier (a cordierite honeycomb manufactured by NGK Insulators, Inc., having a diameter of 93 mm and a length of 100 mm) at the upstream (in the flow direction of exhaust gas) side of the carrier and the downstream side, respectively, to obtain catalyst N containing Pt=50 g/ft³, Pd=150 g/ft³, BaO=0.025 g/cc and $Al_2O_3$=0.10 g/cc.

(Catalyst O)

Pt-predoped $Al_2O_3$, BaO-predoped $Al_2O_3$ and Pd-predoped $Al_2O_3$ were supported on a monolithic carrier (a cordierite honeycomb manufactured by NGK Insulators, Inc., having a diameter of 93 mm and a length of 100 mm) at the upstream (in the flow direction of exhaust gas) side of the carrier, the center and the downstream side, respectively, to obtain catalyst O containing Pt=50 g/ft³, Pd=150 g/ft³, BaO=0.025 g/cc and $Al_2O_3$=0.10 g/cc.

(Catalyst P)

BaO-predoped $Al_2O_3$ and Pt-predoped $Al_2O_3$/Pd-predoped $Al_2O_3$ were supported on a monolithic carrier (a cordierite honeycomb manufactured by NGK Insulators, Inc., having a diameter of 93 mm and a length of 100 mm) at the upstream (in the flow direction of exhaust gas) side of the carrier and the downstream side, respectively, to obtain catalyst P containing Pt=50 g/ft³, Pd=150 g/ft³, BaO=0.025 g/cc and $Al_2O_3$=0.10 g/cc.

(Catalyst Q)

There were used two monolithic carriers (each a cordierite honeycomb manufactured by NGK Insulators, Inc., having a diameter of 93 mm and a length of 50 mm). Pt-predoped $Al_2O_3$ was supported on one of the two carriers, and Pd/BaO-predoped $Al_2O_3$ was supported on the other carrier. The total amounts of catalyst components suported on the two monolitic carriers were Pt=50 g/ft³, Pd=150 g/ft³, BaO=0.025 g/cc and $Al_2O_3$=0.10 g/cc (ft³ and cc are those of the two carriers). The Pt-supported carrier and the Pd/BaO-supported carrier were disposed upstream and downstream, respectively, in the flow direction of exhaust gas to obtain catalyst Q.

(Catalyst R)

There were used two monolithic carriers (each a cordierite honeycomb manufactured by NGK Insulators, Inc., having a diameter of 93 mm and a length of 50 mm). Pt/BaO-predoped $Al_2O_3$ was supported on one of the two carriers, and Pd-predoped $Al_2O_3$ was supported on the other carrier. The total amounts of catalyst components suported on the two monolitic carriers were Pt=50 g/ft³, Pd=150 g/ft³, BaO=0.025 g/cc and $Al_2O_3$=0.10 g/cc (ft³ and cc are those of the two carriers). The Pt/BaO-supported carrier and the Pd-supported carrier were disposed upstream and downstream, respectively, in the flow direction of exhaust gas, to obtain catalyst R.

(Catalyst S)

There were used three monolithic carriers (each a cordierite honeycomb manufactured by NGK Insulators, Inc., having a diameter of 93 mm and a length of 33 mm). Pt-predoped $Al_2O_3$ was supported on the first carrier; BaO-predoped $Al_2O_3$ was supported on the second carrier; and Pd-predoped $Al_2O_3$ was supported on the third carrier. The total amounts of catalyst components suported on the three monolitic carriers were Pt=50 g/ft³, Pd=150 g/ft³, BaO=0.025 g/cc and $Al_2O_3$=0.10 g/cc (ft³ and cc are those of the three carriers). The Pt-supported carrier, the BaO-supported carrier and the Pd-supported carrier were disposed upstream, in the center and downstream, respectively, in the flow direction of exhaust gas to obtain catalyst S.

(Catalyst T)

There were used two monolithic carriers (each a cordierite honeycomb manufactured by NGK Insulators, Inc., having a diameter of 93 mm and a length of 50 mm). BaO-predoped Al$_2$O$_3$ was supported on one of the two carriers, and Pd-predoped Al$_2$O$_3$ and Pt-predoped Al$_2$O$_3$ were supported on the other carrier. The total amounts of catalyst components suported on the two monolitic carriers were Pt=50 g/ft$^3$, Pd=150 g/ft$^3$, BaO=0.025 g/cc and Al$_2$O$_3$=0.10 g/cc (ft$^3$ and cc are those of the two carriers). The BaO-supported carrier and the Pt/Pd-supported carrier were disposed upstream and downstream, respectively, in the flow direction of exhaust gas to obtain catalyst T.

(Measurement of light-off temperatures of catalysts L to T)

The catalysts L to T were measured for HC light-off performances. Each catalyst was subjected to 750° C.×100 hours aging and then measured for light-off temperature by the method 1. The results (Examples 51–59) are shown in Table 8. As is clear from Table 8, use of precious metal and BaO in a mixed state gives a better result.

TABLE 8

|  | Catalyst | Light-off temp. (°C.) |
| --- | --- | --- |
| Example 51 | L | 184 |
| Example 52 | M | 184 |
| Example 53 | N | 187 |
| Example 54 | O | 296 |
| Example 55 | P | 252 |
| Example 56 | Q | 264 |
| Example 57 | R | 192 |
| Example 58 | S | 258 |
| Example 59 | T | 264 |

{Production of adsorbents}

(Adsorbent A)

β-Zeolite (a product of The PQ Corporation) having a SiO$_2$/Al$_2$O$_3$ molar ratio of 150 was supported, in an amount of 0.15 g/cc, on a cordierite honeycomb structure (a product of NGK Insulators, Inc.) having a diameter of 144 mm, a length of 100 mm, a rib thickness of 150 μm and a cell density of 400 cells/in.$^2$), followed by firing at 550° C., to obtain adsorbent A.

(Adsorbent A')

Adsorbent A' was obtained in the same manner as for adsorbent A except that the β-zeolite was replaced by ZSM-5 (a product of The PQ Corporation).

(Adsorbent B)

β-Zeolite (a product of The PQ Corporation) having a SiO$_2$/Al$_2$O$_3$ molar ratio of 150 was supported, in an amount of 0.12 g/cc, on the same honeycomb structure as used for adsorbent A, followed by firing at 550° C., to form a first layer. On this first layer was supported the compound oxide β mentioned with respect to the production of catalyst D, followed by firing, to form a second layer, whereby adsorbent B was obtained. The supported amounts in the second layer were γ-Al$_2$O$_3$=0.06 g/ft$^3$ and Pd=200 g/ft$^3$.

(Adsorbent C)

Adsorbent C was obtained in the same manner as for adsorbent B except that the compound oxide β was replaced by the compound oxide a mentioned with respect to the production of catalyst A. The supported amounts in the second layer were γ-Al$_2$O$_3$=0.06 g/ft$^3$, BaO=0.02 g/cc and Pd=200 g/ft$^3$.

(Adsorbent D)

There was used, as a carrier for adsorbent, a hollow cylindrical cordierite honeycomb structure (a product of NGK Insulators, Inc.) having an outside diameter of 144 mm, an inside diameter of 45 mm, a length of 100 mm, a rib thickness of 150 μm and a cell density of 400 cells/in.$^2$. Adsorbent D was obtained in the same manner as for adsorbent B except that the above carrier was used. The supported amounts were β-zeolite=0.12 g/cc, γ-Al$_2$O$_3$=0.06 g/cc and Pd=200 g/ft$^3$.

(Adsorbent D')

Adsorbent D' was obtained in the same manner as for adsorbent D except that the β-zeolite was replaced by ZSM-5.

(Adsorbent E)

Adsorbent E was obtained in the same manner as for adsorbent D except that the compound oxide β was replaced by the compound oxide α. The supported amounts were β-zeolite=0.12 g/cc, γ-Al$_2$O$_3$=0.06 g/cc, BaO=0.02 g/cc and Pd=200 g/ft$^3$.

{Production of adsorbent-catalysts}

(Adsorbent-catalyst A)

From a cylindrical cordierite honeycomb structure (a product of NGK Insulators, Inc.) having a diameter of 144 mm, a length of 100 mm, a rib thickness of 150 μm and a cell density of 400 cells/in.$^2$ was removed a cylindrical portion of 88 mm (diameter of cross section) and 50 mm (length) having the same central axis as the honeycomb structure in the passage direction of the honeycomb structure and extending from one end of the honeycomb structure to the interior of the honeycomb structure; and the resulting honeycomb structure having a cylindrical hollow was used as a carrier for adsorbent-catalyst. The compound oxide β mentioned with respect to the production of catalyst D was supported on the central cylindrical portion of the above-obtained honeycomb structure (having a cylindrical hollow) extending from the hollow to other end of the honeycomb structure and having a diameter of cross section of 88 mm and a length of 50 mm in the passage direction of the honeycomb structure. Firing was conducted to form a catalyst layer containing γ-Al$_2$O$_3$=0.09 g/cc and Pd=200 g/ft$^3$. Then, β-zeolite was supported on the portion of the honeycomb structure surrounding its catalyst layer-supported portion. Firing was conducted at 550° C. to form a first layer containing β-zeolite=0.12 g/cc. Thereafter, the compound oxide β was supported on the first layer, followed by firing, to form a second layer containing γ-Al$_2$O$_3$=0.09 cc/g and Pd=200 g/ft$^3$. Thus, adsorbent-catalyst A was obtained.

(Adsorbent-catalyst B)

Adsorbent-catalyst B was obtained in the same manner as for adsorbent-catalyst A except that the compound oxide β was replaced by the compound oxide α.

(Adsorbent-catalyst C)

There was used, as a carrier for adsorbent-catalyst, a cordierite honeycomb structure (a product of NGK Insulators, Inc.) having a elliptical cross section (major axis=170 mm and minor axis=81 mm), a length of 100 mm, a rib thickness of 150 μm and a cell density of 400 cells/in. The compound oxide β was supported on the portion of the honeycomb structure extending from one end of the cross-sectional major axis toward the cross-sectional center (the distance of extention=40 mm), to form a catalyst layer containing γ-Al$_2$O$_3$=0.09 g/cc and Pd=120 g/ft$^3$. Then, on the portion of the honeycomb structure other than the catalyst layer was supported β-zeolite, followed by firing at 550° C., to form a first layer containing β-zeolite=0.12 g/cc. On the first layer was supported the compound oxide β, followed by firing, to form a second layer containing γ-Al$_2$O$_3$=0.09 g/cc and Pd=200 g/ft$^3$. Thus, adsorbent-catalyst C was obtained.

(Adsorbent-catalyst D)

Adsorbent-catalyst D was obtained in the same manner as for adsorbent-catalyst C except that the compound oxide β was replaced by the compound oxide α.

{Production of other catalysts}
(Catalyst L')

Catalyst L' was obtained in the same manner as for catalyst L except that the monolithic carrier used had a length of 34 mm.

(Catalyst L")

Commercial $\gamma$-$Al_2O_3$ was impregnated with an aqueous magnesium nitrate solution and then calcinated at 700° C. for 3 hours to obtain a magnesia/alumina compound oxide. The oxide was disintegrated to obtain a magnesia/alumina compound oxide powder. Using this powder in place of the compound oxide $\alpha$, catalyst L" was obtained in the same manner as for catalyst L.

(Catalyst L''')

Commercial $\gamma$-$Al_2O_3$ was impregnated with an aqueous lanthanum nitrate solution and then calcinated at 700° C. for 3 hours to obtain a lanthanum oxide/alumina compound oxide. The oxide was disintegrated to obtain a lanthanum oxide/alumina compound oxide powder. Using this powder in place of the compound oxide $\alpha$, catalyst L''' was obtained in the same manner as for catalyst L.

(Catalyst L"")

Commercial $\gamma$-$Al_2O_3$ was impregnated with an aqueous zirconyl nitrate solution and then calcinated at 700° C. for 3 hours to obtain a zirconia/alumina compound oxide. The oxide was disintegrated to obtain a zirconia/alumina compound oxide powder. Using this powder in place of the compound oxide a and changing the length of the monolithic carrier to 34 mm, catalyst L"" was obtained in the same manner as for catalyst L.

(Catalyst U)

Catalyst U was obtained in the same manner as for catalyst A except that the compound oixde $\alpha$ was replaced by the compound oxide $\beta$. The supported amounts were $\gamma$-$Al_2O_3$=0.09 g/cc and Pd=120 g/ft$^3$.

(Catalyst U')

Catalyst U' was obtained in the same manner as for catalyst U except that the monolithic carrier used had a length of 34 mm.

(Cataytst V)

To commercial $\gamma$-$Al_2O_3$ were added cerium acetate and cerium oxide (both are oxygen storage capability improvers during steady-state operation) in a total amount of 30% by weight in terms of oxide. They were disintegrated by wet method, dried and calcinated at 550° C. to obtain an $Al_2O_3$/$CeO_2$ compound oxide. The oxide was impregnated with Pt or Rh using an aqueous $H_2PtCl_5$ or $Rh(NO_3)_3$ solution. The impregnated oxide was dried, followed by firing at 500° C. to obtain a Pt-supported $Al_2O_3$/$CeO_2$ powder and a Rh-supported $Al_2O_3$/$CeO_2$ powder separately. To each of these two kins of powders were added appropriate amounts of water and acetic acid. In the resulting mixture containing the Pt-supported $Al_2O_3$/$CeO_2$ powder was dipped a monolithic carrier (a cordierite honeycomb manufactured by NGK Insulators, Inc., having a rib thickness of 6 mil, a cell density of 400 cpi$^2$ and a volume of 1.7 liters) to support, as a first catalyst layer, the Pt-supported $Al_2O_3$/$CeO_2$ powder in an amount of 0.15 g/cc. On this first catalyst layer was applied the mixture containing the Rh-supported $Al_2O_3$/$CeO_2$ powder, to support, as a second catalyst layer, the Rh-supported $Al_2O_3$/$CeO_2$ powder in an amount of 0.05 g/cc. The resulting honeycomb was fired at 500° C. to obtain catalyst V. The supported amount of precious metals in catalyst V was 40 g/ft$^3$ (Pt/Rh=5/1).

(Catalyst W)

To commercial $\gamma$-$Al_2O_3$ were added cerium acetate and cerium oxide (both are oxygen storage capability improvers during steady-state operation) in a total amount of 30% by weight in terms of oxide. They were disintegrated by wet method, dried and calcinated at 550° C. to obtain an $Al_2O_3$/$CeO_2$ compound oxide. The oxide was mixed with an aqueous barium nitrate solution. Thereto was added acetic acid. The resulting mixture was disintegrated by wet method, dried, and calcinated at 700° C. to obtain a BaO/$Al_2O_3$/$CeO_2$ compound oxide (the amount of BaO was 30% by weight of $Al_2O_3$). The oxide was impregnated with Pt or Rh using an aqueous platinum chloride or $Rh(NO_3)_3$ solution. The impregnated oxide was dried, followed by firing at 500° C. to obtain a Pt-supported BaO/$Al_2O_3$/$CeO_2$ powder and a Rh-supported BaO/$Al_2O_3$/$CeO_2$ powder separately. To each of these two kins of powders were added appropriate amounts of water and acetic acid. In the resulting mixture containing the Pt-supported BaO/$Al_2O_3$/$CeO_2$ powder was dipped a monolithic carrier (a cordierite honeycomb manufactured by NGK Insulators, Inc., having a rib thickness of 6 mil, a cell density of 400 cpi$^2$ and a volume of 1.7 liters) to support, as a first catalyst layer, the Pt-supported BaO/$Al_2O_3$/$CeO_2$ powder in an amount of 0.15 g/cc. On this first catalyst layer was applied the mixture containing the Rh-supported BaO/$Al_2O_3$/$CeO_2$ powder, to support, as a second catalyst layer, the Rh-supported BaO/$Al_2O_3$/$CeO_2$ powder in an amount of 0.05 g/cc. The resulting honeycomb was fired at 500° C. to obtain catalyst W. The supported amount of precious metals in catalyst W was 40 g/ft$^3$ (Pt/Rh=5/1).

{Assembling of exhaust gas purification systems}

The following exhaust gas purification systems were assembled using the above-obtained catalysts, adsorbents and adsorbent-catalysts. In order to relate the alphabetical letters indicating the kinds of the catalysts, adsorbents and adsorbent-catalysts to the Arabian figures used in FIGS. 13–33, these Arabian figures were shown in the following by placing a relevant Arabian figure in parenthesis after each alphabetical letter.

(System $A_1$)

Figure 13:
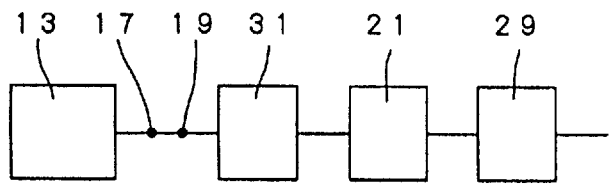
FIG. 13 is a drawing showing an example of the system for exhaust gas purification according to the present invention.

As shown in FIG. 13, in the flow path of an exhaust gas from an engine (13) were placed adsorbent D (31) at an upstream site and catalyst L (21) downstream of adsorbent D (31). Between the engine (13) and adsorbent D (31) were provided an $O_2$ sensor (17) for A/F adjustment at an upstream site and a hole (19) for secondary air feeding for ignition acceleration, downstream of the $O_2$ sensor (17). The distance from the engine manifold outlet to adsorbent D (31) was 600 mm, and the space between adsorbent D (31) and catalyst L (21) was 30 mm. Further, catalyst V (29) was placed at a site 1,200 mm apart from the engine manifold outlet.

(System $A_2$)

System $A_2$ was assembled in the same manner as for system $A_1$ except that adsorbent D was replaced by adsorbent A. (System $A_3$)

System $A_3$ was assembled in the same manner as for system $A_1$ except that adsorbent D was replaced by adsorbent A'.

(System $A_4$)

System $A_4$ was assembled in the same manner as for system $A_1$ except that adsorbent D was replaced by adsorbent B. (System $A_5$)

System $A_5$ was assembled in the same manner as for system $A_1$ except that adsorbent D was replaced by adsorbent C.

(System $A_6$)

System $A_6$ was assembled in the same manner as for system $A_1$ except that adsorbent D was replaced by adsorbent D'.

(System A₇)

System A₇ was assembled in the same manner as for system A₁ except that adsorbent D was replaced by adsorbent E.

(System A₈)

System A₈ was assembled in the same manner as for system A₁ except that adsorbent D was replaced by adsorbent-catalyst A.

(System A₉)

System A₉ was assembled in the same manner as for system A₁ except that adsorbent D was replaced by adsorbent-catalyst B.

(System A₁₀)

System A₁₀ was assembled in the same manner as for system A₁ except that adsorbent D was replaced by adsorbent-catalyst C.

(System A₁₁)

System A₁₁ was assembled in the same manner as for system A₁ except that adsorbent D was replaced by adsorbent-catalyst D.

(System A₁₂)

System A₁₂ was assembled in the same manner as for system A₁ except that catalyst V was replaced by catalyst W.

(System B)

Figure 14:
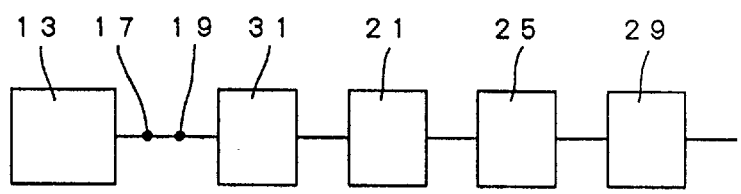
FIG. 14 is a drawing showing an example of the system for exhaust gas purification according to the present invention.

As shown in FIG. 14, in the flow path of an exhaust gas from an engine (13) were placed adsorbent D (31), catalyst L (21) and catalyst U (25) in this order from the engine (13) side. Between the engine (13) and adsorbent D (31) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst D (31) was 600 mm, and the spaces between adsorbent D (31), catalyst L (21) and catalyst U (25) were each 30 mm. Further, catalyst V (29) was placed at a site 1,200 mm apart from the engine manifold outlet.

(System C)

Figure 15:
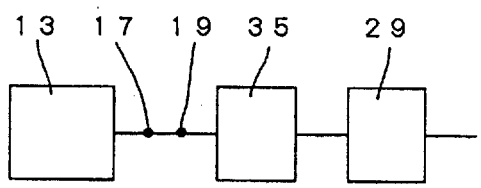
FIG. 15 is a drawing showing an example of the system for exhaust gas purification according to the present invention.

As shown in FIG. 15, adsorbent E (35) was placed in the flow path of an exhaust gas from an engine (13). Between the engine (13) and adsorbent E (35) were provided an $O_2$ sensor (17) for A/F adjustment at an upstream site and a hole (19) for secondary air feeding for ignition acceleration, downstream of the $O_2$ sensor (17). The distance from the engine manifold outlet to adsorbent E (35) was 600 mm. Further, catalyst V (29) was placed at a site 1,200 mm apart from the engine manifold outlet.

(System D)

Figure 16:
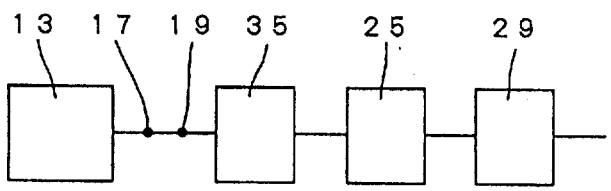
FIG. 16 is a drawing showing an example of the system for exhaust gas purification according to the present invention.

As shown in FIG. 16, in the flow path of an exhaust gas from an engine (13) were placed adsorbent E (35) at an upstream site and catalyst U (25) downstream of adsorbent E (35). Between the engine (13) and adsorbent E (35) were provided an $O_2$ sensor (17) for A/F adjustment at an upstream site and a hole (19) for secondary air feeding for ignition acceleration, downstream of the $O_2$ sensor (17). The distance from the engine manifold outlet to adsorbent E (35) was 600 mm, and the space between adsorbent E (35) and catalyst U (25) was 30 mm. Further, catalyst V (29) was placed at a site 1,200 mm apart from the engine manifold outlet.

(System E)

Figure 17:
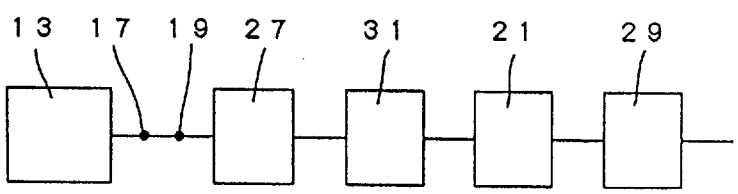
FIG. 17 is a drawing showing an example of the system for exhaust gas purification according to the present invention.

As shown in FIG. 17, in the flow path of an exhaust gas from an engine (13) were placed catalyst U' (27), adsorbent D (31) and catalyst L (21) in this order from the engine (13) side. Between the engine (13) and catalyst U" (27) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst U' (27) was 600 mm, and the spaces between catalyst U' (27), adsorbent D (31) and catalyst L (21) were each 30 mm. Further, catalyst V (29) was placed at a site 1,200 mm apart from the engine manifold outlet.

(System F)

Figure 18:
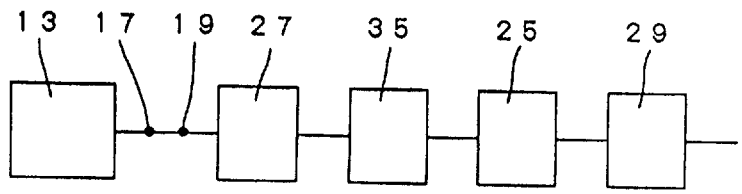
FIG. 18 is a drawing showing an example of the system for exhaust gas purification according to the present invention.

As shown in FIG. 18, in the flow path of an exhaust gas from an engine (13) were placed catalyst U' (27), adsorbent E (35) and catalyst U (25) in this order from the engine (13) side. Between the engine (13) and catalyst U' (27) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst U' (27) was 600 mm, and the spaces between catalyst U' (27), adsorbent E (35) and catalyst U (25) were each 30 mm. Further, catalyst V (29) was placed at a site 1,200 mm apart from the engine manifold outlet.

(System G₁)

Figure 19:
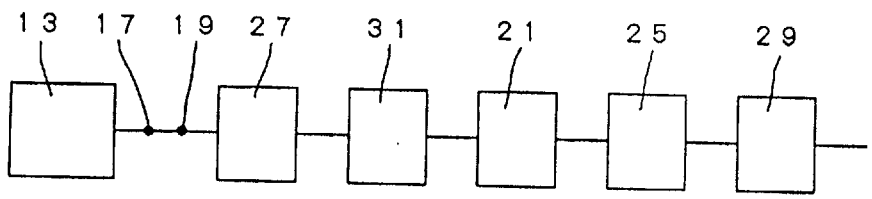
FIG. 19 is a drawing showing an example of the system for exhaust gas purification according to the present invention.

As shown in FIG. 19, in the flow path of an exhaust gas from an engine (13) were placed catalyst U' (27), adsorbent D (31), catalyst L (21) and catalyst U (25) in this order from the engine (13) side. Between the engine (13) and catalyst U' (27) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst U' (27) was 600 mm, and the spaces between catalyst U' (27), adsorbent D (31), catalyst L (21) and catalyst U (25) were each 30 mm. Further, catalyst V (29) was placed at a site 1,200 mm apart from the engine manifold outlet.

(System G₂)

System G₂ was assembled in the same manner as for system G₁ except that adsorbent D was replaced by adsorbent A. (System G₃)

System G₃ was assembled in the same manner as for system G₁ except that adsorbent D was replaced by adsorbent B.

(System G₄)

System G₄ was assembled in the same manner as for system G₁ except that adsorbent D was replaced by adsorbent D'.

(System G₅)

System G₅ was assembled in the same manner as for system G₁ except that catalyst L was replaced by catalyst D.

(System G₆)

System G₆ was assembled in the same manner as for system G₁ except that catalyst L was replaced by catalyst M.

(System G₇)

System G₇ was assembled in the same manner as for system G₁ except that catalyst L was replaced by catalyst Q.

(System G₈)

System G₈ was assembled in the same manner as for system G₁ except that catalyst L was replaced by catalyst L".

(System G₉)

System G₉ was assembled in the same manner as for system G₁ except that catalyst L was replaced by catalyst L'". (System H₁)

Figure 20:
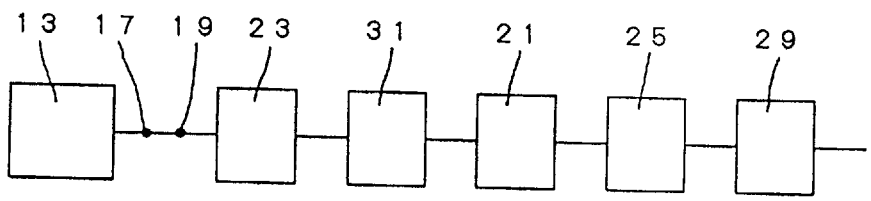
FIG. 20 is a drawing showing an example of the system for exhaust gas purification according to the present invention.

As shown in FIG. 20, in the flow path of an exhaust gas from an engine (13) were placed catalyst L' (23), adsorbent D (31), catalyst L (21) and catalyst U (25) in this order from the engine (13) side. Between the engine (13) and catalyst L' (23) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst L' (23) was 600 mm, and the spaces between catalyst L' (23), adsorbent D (31), catalyst L (21) and catalyst U (25) were each 30 mm. Further, catalyst V (29) was placed at a site 1,200 mm apart from the engine manifold outlet.

(System H$_2$)

System H$_2$ was assembled in the same manner as for system H$_1$ except that catalyst L' was replaced by catalyst L''''.

(System I)

Figure 21:
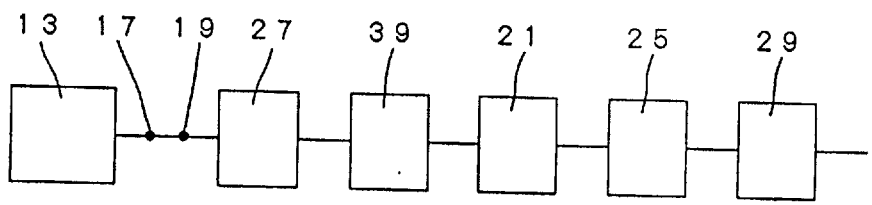
FIG. 21 is a drawing showing an example of the system for exhaust gas purification according to the present invention.

As shown in FIG. 21, in the flow path of an exhaust gas from an engine (13) were placed catalyst U' (27), adsorbent-catalyst C (39), catalyst L (21) and catalyst U (25) in this order from the engine (13) side. Between the engine (13) and catalyst U' (27) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst U' (27) was 600 mm, and the spaces between catalyst U' (27), adsorbent-catalyst C (39), catalyst L (21) and catalyst U (25) were each 30 mm. Further, catalyst V (29) was placed at a site 1,200 mm apart from the engine manifold outlet.

(System J)

Figure 22:
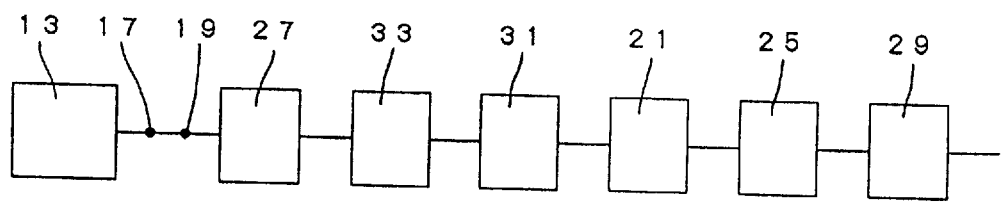
FIG. 22 is a drawing showing an example of the system for exhaust gas purification according to the present invention.

As shown in FIG. 22, in the flow path of an exhaust gas from an engine (13) were placed catalyst U' (27), adsorbent D' (33), adsorbent D (31), catalyst L (21) and catalyst U (25) in this order from the engine (13) side. Between the engine (13) and catalyst U' (27) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst U' (27) was 600 mm, and the spaces between catalyst U' (27), adsorbent D' (33), adsorbent D (31), catalyst L (21) and catalyst U (25) were each 30 mm. Further, catalyst V (29) was placed at a site 1,200 mm apart from the engine manifold outlet.

Figure 23:
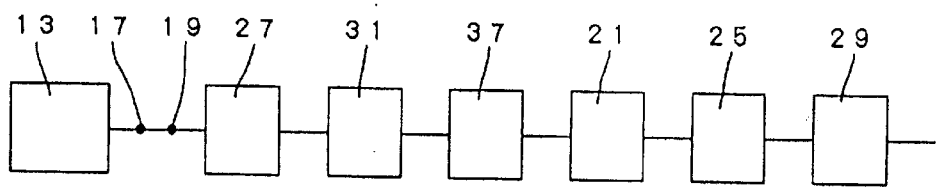
FIG. 23 is a drawing showing an example of the system for exhaust gas purification according to the present invention.

(System K) As shown in FIG. 23, in the flow path of an exhaust gas from an engine (13) were placed catalyst U' (27), adsorbent D (31), adsorbent-catalyst A (37), catalyst L (21) and catalyst U (25) in this order from the engine (13) side. Between the engine (13) and catalyst U' (27) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst U' (27) was 600 mm, and the spaces between catalyst U' (27), adsorbent D (31), adsorbent-catalyst A (37), catalyst L (21) and catalyst U (25) were each 30 mm. Further, catalyst V (29) was placed at a site 1,200 mm apart from the engine manifold outlet.

(System L)

Figure 24:
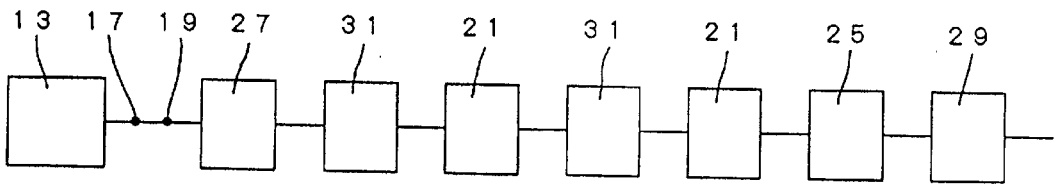
FIG. 24 is a drawing showing an example of the system for exhaust gas purification according to the present invention.

As shown in FIG. 24, in the flow path of an exhaust gas from an engine (13) were placed catalyst U' (27), adsorbent D (31), catalyst L (21), adsorbent D (31), catalyst L (21), catalyst U (25) and catalyst V (29) in this order from the engine (13) side. Between the engine (13) and catalyst U' (27) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst U' (27) was 600 mm, and the spaces between catalyst U' (27), adsorbent D (31), catalyst L (21), adsorbent D (31), catalyst L (21), catalyst U (25) and catalyst V (29) were each 30 mm.

(System M)

Figure 25:
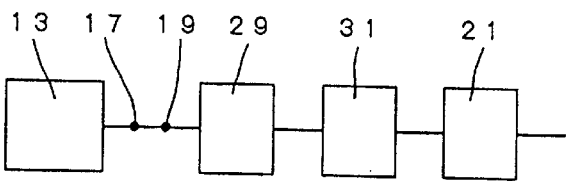
FIG. 25 is a drawing showing an example of the system for exhaust gas purification according to the present invention.

As shown in FIG. 25, in the flow path of an exhaust gas from an engine (13) were placed catalyst V (29), adsorbent D (31) and catalyst L (21) in this order from the engine (13) side. Between the engine (13) and catalyst V (29) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst V (29) was 600 mm, and the spaces between catalyst V (29), adsorbent D (31) and catalyst L (21) were each 30 mm.

Figure 26:
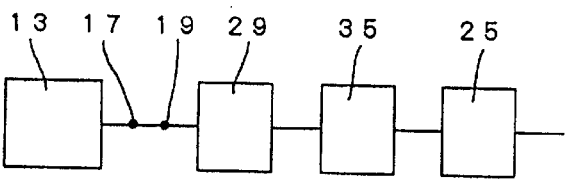
FIG. 26 is a drawing showing an example of the system for exhaust gas purification according to the present invention.

(System N) As shown in FIG. 26, in the flow path of an exhaust gas from an engine (13) were placed catalyst V (29), adsorbent E (35) and catalyst U (25) in this order from the engine (13) side. Between the engine (13) and catalyst V (29) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst V (29) was 600 mm, and the spaces between catalyst V (29), adsorbent E (35) and catalyst U (25) were each 30 mm.

(System O$_1$)

Figure 27:
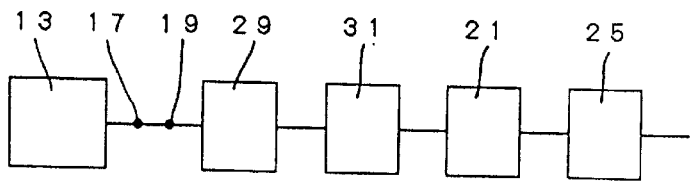
FIG. 27 is a drawing showing an example of the system for exhaust gas purification according to the present invention.

As shown in FIG. 27, in the flow path of an exhaust gas from an engine (13) were placed catalyst V (29), adsorbent D (31), catalyst L (21) and catalyst U (25) in this order from the engine (13) side. Between the engine (13) and catalyst V (29) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst V (29) was 600 mm, and the spaces between catalyst V (29), adsorbent D (31), catalyst L (21) and catalyst U (25) were each 30 mm.

(System O$_2$)

System O$_2$ was assembled in the same manner as for catalyst O$_1$ except that adsorbent D was replaced by adsorbent A.

(System O$_3$)

System O$_3$ was assembled in the same manner as for catalyst O$_1$ except that adsorbent D was replaced by adsorbent B.

(System O$_4$)

System O$_4$ was assembled in the same manner as for catalyst O$_1$ except that adsorbent D was replaced by adsorbent D'.

(System O$_5$)

System O$_5$ was assembled in the same manner as for catalyst O$_1$ except that catalyst L was replaced by catalyst D.

(System O$_6$)

System O$_6$ was assembled in the same manner as for catalyst O$_1$ except that catalyst L was replaced by catalyst M.

(System O$_7$)

System O$_7$ was assembled in the same manner as for catalyst O$_1$ except that catalyst L was replaced by catalyst Q.

(System O$_8$)

System O$_8$ was assembled in the same manner as for catalyst O$_1$ except that catalyst L was replaced by catalyst (System O$_9$)

System O$_9$ was assembled in the same manner as for catalyst O$_1$ except that catalyst L was replaced by catalyst L'''.

(System P)

Figure 28:
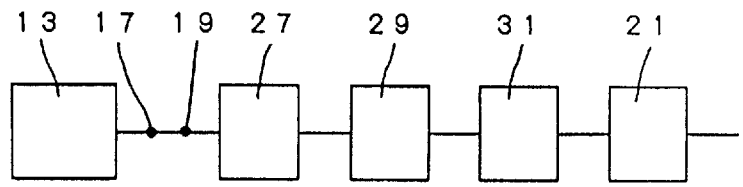
FIG. 28 is a drawing showing an example of the system for exhaust gas purification according to the present invention.

As shown in FIG. 28, in the flow path of an exhaust gas from an engine (13) were placed catalyst U' (27), catalyst V (29), adsorbent D (31) and catalyst L (21) in this order from the engine (13) side. Between the engine (13) and catalyst U' (27) were provided an O$_2$ sensor (17) for A/F adjustment at an upstream site and a hole (19) for secondary air feeding for ignition acceleration, downstream of the O$_2$ sensor (17). The distance from the engine manifold outlet to catalyst V (29) was 600 mm, and the spaces between catalyst U' (27), catalyst V (29), adsorbent D (31) and catalyst L (21) were each 30 mm.

(System Q)

Figure 29:
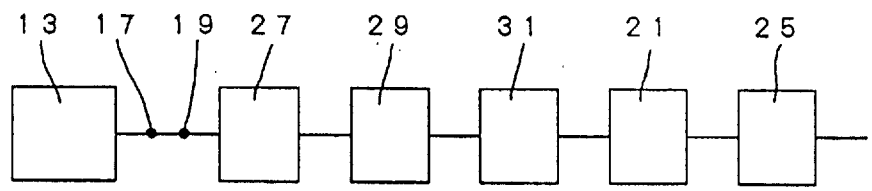
FIG. 29 is a drawing showing an example of the system for exhaust gas purification according to the present invention.

As shown in FIG. 29, in the flow path of an exhaust gas from an engine (13) were placed catalyst U' (27), catalyst V (29), adsorbent D (31), catalyst L (21) and catalyst U (25) in this order from the engine (13) side. Between the engine (13) and catalyst U' (27) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst V (29) was 600 mm, and the spaces between catalyst U' (27), catalyst V (29), adsorbent D (31), catalyst L (21) and catalyst U (25) were each 30 mm.

(System $R_1$)

Figure 30:
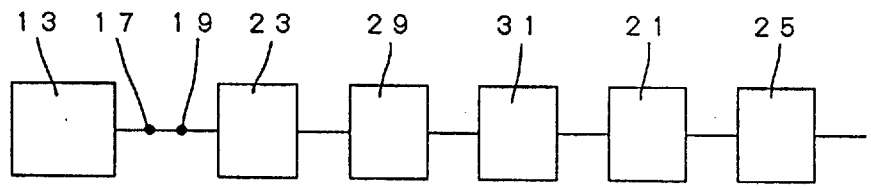
FIG. 30 is a drawing showing an example of the system for exhaust gas purification according to the present invention.

As shown in FIG. 30, in the flow path of an exhaust gas from an engine (13) were placed catalyst L' (23), catalyst V (29), adsorbent D (31), catalyst L (21) and catalyst U (25) in this order from the engine (13) side. Between the engine (13) and catalyst L' (23) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst V (29) was 600 mm, and the spaces between catalyst L' (23), catalyst V (29), adsorbent D (31), catalyst L (21) and catalyst U (25) were each 30 mm.

(System $R_2$)

System $R_2$ was assembled in the same manner as for system $R_1$ except that catalyst L' was replaced by L''''.

(System S)

Figure 31:
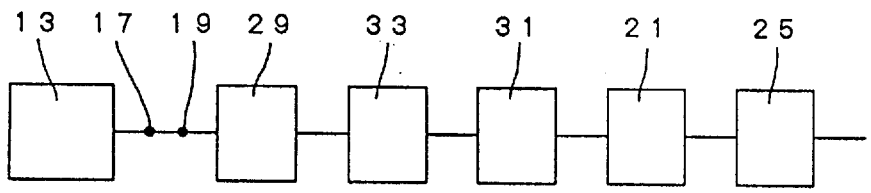
FIG. 31 is a drawing showing an example of the system for exhaust gas purification according to the present invention.

As shown in FIG. 31, in the flow path of an exhaust gas from an engine (13) were placed catalyst V (29), adsorbent D' (33), adsorbent D (31), catalyst L (21) and catalyst U (25) in this order from the engine (13) side. Between the engine (13) and catalyst V (29) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst V (29) was 600 mm, and the spaces between catalyst V (29), adsorbent D' (33), adsorbent D (31), catalyst L (21) and catalyst U (25) were each 30 mm.

(System T)

Figure 32:
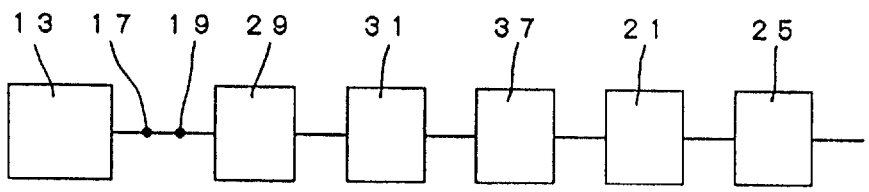
FIG. 32 is a drawing showing an example of the system for exhaust gas purification according to the present invention.

As shown in FIG. 32, in the flow path of an exhaust gas from an engine (13) were placed catalyst V (29), adsorbent D (31), adsorbent-catalyst A (37), catalyst L (21) and catalyst U (25) in this order from the engine (13) side. Between the engine (13) and catalyst V (29) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst V (29) was 600 mm, and the spaces between catalyst V (29), adsorbent D (31), adsorbent-catalyst A (37), catalyst L (21) and catalyst U (25) were each 30 mm.

(System U)

Figure 33:
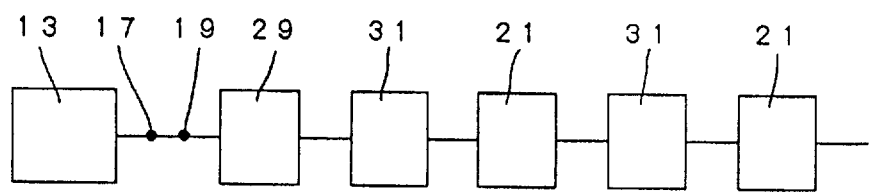
FIG. 33 is a drawing showing an example of the system for exhaust gas purification according to the present invention.

As shown in FIG. 33, in the flow path of an exhaust gas from an engine (13) were placed catalyst V (29), adsorbent D (31), catalyst L (21), adsorbent D (31) and catalyst L (21) in this order from the engine (13) side. Between the engine (13) and catalyst V (29) were provided an $O_2$ sensor (17) for A/F adjustment at an upstream site and a hole (19) for secondary air feeding for ignition acceleration, downstream of the $O_2$ sensor (17). The distance from the engine manifold outlet to catalyst V (29) was 600 mm, and the spaces between catalyst V (29), adsorbent D (31), catalyst L (21), adsorbent D (31) and catalyst L (21) were each 30 mm.

{Performance evaluation of exhaust gas systems}

In order to evaluate the exhaust gas performances of the above systems, an FTP test (LA-4 mode) was conducted using each of two engines different in NO discharge amount. The test was conducted three times for each system. In the first time, the exhaust gas purification performance of system during cold start was examined using one of the two engines, low in NO discharge amount. In the second time, the exhaust gas purification performance of system during cold start was examined using the other engine relatively high in NO discharge amount. In the third time, steady-state operation was conducted for 30 minutes using the engine low in NO discharge amount; then, the engine was stopped and allowed to sufficiently cool; and the engine was restarted to examine the exhaust gas purification performance of system during cold start. In each time, secondary air was fed through the hole of each system in a simple manner using an air pump at a rate of 100 l/min for 90 seconds from engine cranking to obtain an oxygen-excessive exhaust gas. The exhaust gas generated was collected by a CVS method, and its emission value was then calculated. The test results (Examples 60–109) are shown in Table 9 and Table 10. As is clear from Table 9 and Table 10, the emission value was significantly lowered by using a system containing a catalyst of low-temperature light-off performance.

TABLE 9

| | | First time | | Second time | | Third time | |
|---|---|---|---|---|---|---|---|
| Ex. | System | Bagl-a (g) | Total (g/mile) | Bagl-a (g) | Total (g/mile) | Bagl-a (g) | Total (g/mile) |
| | Base (using no system) | 2.21 | 0.236 | 2.35 | 0.238 | 2.21 | 0.236 |
| 60 | $A_1$ | 0.83 | 0.085 | 0.78 | 0.079 | 0.71 | 0.075 |
| 61 | $A_2$ | 0.99 | 0.099 | 0.97 | 0.098 | 0.90 | 0.091 |
| 62 | $A_3$ | 0.95 | 0.096 | 0.93 | 0.094 | 0.84 | 0.083 |
| 63 | $A_4$ | 0.90 | 0.091 | 0.88 | 0.087 | 0.78 | 0.078 |
| 64 | $A_5$ | 0.87 | 0.088 | 0.84 | 0.083 | 0.75 | 0.078 |
| 65 | $A_6$ | 0.86 | 0.087 | 0.82 | 0.081 | 0.74 | 0.077 |
| 66 | $A_7$ | 0.78 | 0.077 | 0.67 | 0.067 | 0.63 | 0.065 |
| 67 | $A_8$ | 0.84 | 0.086 | 0.78 | 0.078 | 0.70 | 0.074 |
| 68 | $A_9$ | 0.79 | 0.080 | 0.70 | 0.071 | 0.63 | 0.066 |
| 69 | $A_{10}$ | 0.84 | 0.086 | 0.78 | 0.078 | 0.72 | 0.075 |
| 70 | $A_{11}$ | 0.80 | 0.082 | 0.74 | 0.075 | 0.65 | 0.065 |
| 71 | $A_{12}$ | 0.75 | 0.076 | 0.72 | 0.074 | 0.65 | 0.064 |
| 72 | B | 0.77 | 0.079 | 0.72 | 0.077 | 0.66 | 0.070 |
| 73 | C | 0.76 | 0.077 | 0.71 | 0.074 | 0.69 | 0.074 |
| 74 | D | 0.76 | 0.077 | 0.70 | 0.070 | 0.65 | 0.069 |
| 75 | E | 0.72 | 0.072 | 0.65 | 0.065 | 0.62 | 0.066 |
| 76 | F | 0.68 | 0.068 | 0.62 | 0.063 | 0.57 | 0.062 |
| 77 | $G_1$ | 0.50 | 0.052 | 0.43 | 0.043 | 0.40 | 0.042 |
| 78 | $G_2$ | 1.28 | 0.130 | 1.21 | 0.129 | 1.15 | 0.128 |
| 79 | $G_3$ | 0.99 | 0.099 | 0.91 | 0.092 | 0.84 | 0.089 |
| 80 | $G_4$ | 0.59 | 0.061 | 0.51 | 0.052 | 0.48 | 0.052 |
| 81 | $G_5$ | 0.52 | 0.053 | 0.45 | 0.047 | 0.42 | 0.045 |
| 82 | $G_6$ | 0.52 | 0.053 | 0.45 | 0.047 | 0.42 | 0.044 |
| 83 | $G_7$ | 0.55 | 0.058 | 0.47 | 0.049 | 0.43 | 0.045 |
| 84 | $G_8$ | 0.51 | 0.053 | 0.43 | 0.043 | 0.40 | 0.042 |
| 85 | $G_9$ | 0.50 | 0.053 | 0.43 | 0.043 | 0.40 | 0.043 |
| 86 | $H_1$ | 0.52 | 0.055 | 0.44 | 0.046 | 0.42 | 0.045 |
| 87 | $H_2$ | 0.54 | 0.058 | 0.44 | 0.045 | 0.41 | 0.045 |
| 88 | I | 0.52 | 0.054 | 0.45 | 0.048 | 0.42 | 0.046 |
| 89 | J | 0.64 | 0.066 | 0.57 | 0.058 | 0.53 | 0.056 |
| 90 | K | 0.58 | 0.059 | 0.53 | 0.055 | 0.51 | 0.055 |
| 91 | L | 0.57 | 0.059 | 0.51 | 0.053 | 0.47 | 0.050 |
| 92 | M | 0.77 | 0.078 | 0.71 | 0.074 | 0.68 | 0.074 |
| 93 | N | 0.72 | 0.076 | 0.67 | 0.071 | 0.63 | 0.068 |
| 94 | $O_1$ | 0.51 | 0.054 | 0.43 | 0.045 | 0.41 | 0.043 |
| 95 | $O_2$ | 1.23 | 0.128 | 1.15 | 0.124 | 1.13 | 0.123 |
| 96 | $O_3$ | 0.89 | 0.096 | 0.81 | 0.086 | 0.79 | 0.085 |
| 97 | $O_4$ | 0.60 | 0.063 | 0.55 | 0.055 | 0.48 | 0.052 |
| 98 | $O_5$ | 0.53 | 0.055 | 0.46 | 0.047 | 0.43 | 0.047 |
| 99 | $O_6$ | 0.53 | 0.055 | 0.47 | 0.047 | 0.43 | 0.046 |
| 100 | $O_7$ | 0.53 | 0.056 | 0.47 | 0.048 | 0.43 | 0.046 |
| 101 | $O_8$ | 0.51 | 0.056 | 0.44 | 0.046 | 0.41 | 0.043 |
| 102 | $O_9$ | 0.51 | 0.055 | 0.44 | 0.046 | 0.41 | 0.044 |
| 103 | P | 0.53 | 0.058 | 0.49 | 0.051 | 0.46 | 0.049 |

TABLE 9-continued

| | | First time | | Second time | | Third time | |
|---|---|---|---|---|---|---|---|
| Ex. | System | Bagl-a (g) | Total (g/mile) | Bagl-a (g) | Total (g/mile) | Bagl-a (g) | Total (g/mile) |
| 104 | Q | 0.52 | 0.057 | 0.46 | 0.048 | 0.42 | 0.045 |
| 105 | $R_1$ | 0.52 | 0.057 | 0.45 | 0.047 | 0.42 | 0.045 |
| 106 | $R_2$ | 0.52 | 0.058 | 0.43 | 0.046 | 0.41 | 0.045 |
| 107 | S | 0.57 | 0.061 | 0.48 | 0.050 | 0.45 | 0.048 |
| 108 | T | 0.58 | 0.063 | 0.52 | 0.053 | 0.48 | 0.051 |
| 109 | U | 0.54 | 0.056 | 0.47 | 0.050 | 0.44 | 0.048 |

By using the systems for exhaust gas purification according to the present invention, the harmful substances contained in exhaust gas discharged from internal combustion engine of automobile or the like, particularly the HC discharged in a large amount during cold start of gasoline engine can be purified effectively.

What is claimed is:

1. A system for exhaust gas purification disposed in an exhaust pipe of an internal combustion engine, comprising:
   a catalyst composition giving an excellent light-off performance at low temperatures, which comprises a precious metal and a substance having at least one of an electron donatability and a nitrogen dioxide absorbability and releasability, and
   optionally an adsorbent having hydrocarbon adsorbability.

2. A system for exhaust gas purification according to claim 1, wherein the combustible components contained in an exhaust gas to be purified are reacted with nitrogen dioxide in the presence of said catalyst composition giving an excellent light-off performance at low temperatures, at a temperature lower than the light-off temperature of the oxidation reaction between said combustible components and oxygen; thereby, part of the exhaust gas is purified; the heat generated by the above reaction increases the temperatures of said catalyst composition and its surroundings; thereby, the hydrocarbons, nitrogen oxides and carbon monoxide contained in the exhaust gas are purified.

3. A system for exhaust gas purification according to claim 1, wherein the substance having an electron donatability, present in said catalyst composition giving an excellent light-off performance at low temperatures supplies electrons to the precious metal also present in said catalyst composition; whereby, the adsorbability of the precious metal for at least one of hydrocarbons and carbon monoxide contained in an exhaust gas to be purified is reduced and said at least one of the hydrocarbons and carbon monoxide is reacted with oxygen at a temperature lower than the light-off temperature of a three-way catalyst not containing any substance having an electron donatability; whereby, part of the exhaust gas is purified; the heat generated by the above reaction increases the temperatures of said catalyst composition and its surroundings; and whereby, the hydrocarbons, nitrogen oxides and carbon monoxide contained in the exhaust gas are purified.

4. A system for exhaust gas purification according to claim 1, wherein the precious metal is at least one of Pt, Pd and Rh.

5. A system for exhaust gas purification according to claim 1, wherein the precious metal is at least one of Pt and Pd.

6. A system for exhaust gas purification according to claim 1, wherein said adsorbent is disposed upstream of said catalyst composition in the flow path of exhaust gas.

7. A system for exhaust gas purification according to claim 1, wherein said adsorbent and said catalyst composition are disposed at nearly same positions in the flow path of exhaust gas with no distance being taken between them.

8. A system for exhaust gas purification according to claim 1, wherein another catalyst for exhaust gas purification is disposed downstream of said adsorbent and said catalyst composition in the flow path of exhaust gas.

9. A system for exhaust gas purification according to claim 1, wherein another catalyst for exhaust gas purification is disposed upstream of said adsorbent and said catalyst composition in the flow path of exhaust gas.

10. A system for exhaust gas purification according to claim 1, wherein said adsorbent contains a catalyst component.

11. A system for exhaust gas purification according to claim 10, wherein the adsorbent containing a catalyst component contains a precious metal and a substance having at least one of an electron donatability and a nitrogen dioxide absorbability and releasability.

12. A system for exhaust gas purification according to claim 10, wherein the adsorbent containing a catalyst component contains a rare earth element oxide.

13. A system for exhaust gas purification according to claim 1, wherein said adsorbent comprises zeolite.

14. A system for exhaust gas purification according to claim 13, wherein the zeolite has a $SiO_2/Al_2O_3$ molar ratio of 40 or more.

15. A system for exhaust gas purification according to claim 13, wherein the zeolite comprises at least one precious metal selected from the group consisting of Pt, Pd and Rh.

16. A system for exhaust gas purification according to claim 13, wherein the zeolite comprises at least one of the ions of group IB elements (Cu, Ag and Au) of the periodic table.

17. A system for exhaust gas purification according to claim 1, wherein the substance having at least one of an electron donatability and a nitrogen dioxide absorbability and releasability is at least one element selected from the group consisting of alkali metals, alkaline earth metals, rare earth elements, transition metals and actinide elements; an oxide thereof; or a compound oxide containing at least one of said elements.

18. A system for exhaust gas purification according to claim 17, wherein the at least one element is selected from the group consisting of Li, Cs, Mg, Ca, Sr, Ba, Y, Ti, Zr, Hf, La, Ce, Pr, Nd, Th and U.

19. A system for exhaust gas purification according to claim 17, wherein the at least one element is selected from the group consisting of Cs, Mg, Sr, Ba, Y, Zr, Hf, La, Ce and Th.

20. A system according to claim 17, wherein said at least one element is a member selected from the group consisting of Mg, Ba, Zr, La and Cs.

21. A system according to claim 17, wherein said compound oxide containing at least one of said elements is $YBa_2Cu_3O_7$.

22. A system for exhaust gas purification disposed in an exhaust pipe of an internal combustion engine, comprising:
   a catalyst giving an excellent light-off performance at low temperatures, comprising a carrier and a catalyst layer supported thereon, the catalyst layer comprising a precious metal and a substance having at least one of an electron donatability and a nitrogen dioxide absorbability and releasability, and
   optionally an adsorbent comprising a carrier and an adsorbent layer having a hydrocarbon adsorbability, supported on the carrier.

23. A system for exhaust gas purification according to claim 22, wherein the combustible components contained in an exhaust gas to be purified are reacted with nitrogen dioxide in the presence of said catalyst giving an excellent light-off performance at low temperatures, at a temperature lower than the light-off temperature of the oxidation reaction between said combustible components and oxygen; whereby, part of the exhaust gas is purified; the heat generated by the above reaction increases the temperatures of said catalyst and its surroundings; and the hydrocarbons, nitrogen oxides and carbon monoxide contained in the exhaust gas are purified.

24. A system for exhaust gas purification according to claim 22, wherein the substance having an electron donatability, present in said catalyst giving an excellent light-off performance at low temperatures supplies electrons to the precious metal also present in said catalyst; whereby, the adsorbability of the precious metal for at least one of the hydrocarbons and carbon monoxide contained in an exhaust gas to be purified is reduced and said at least one of the hydrocarbons and carbon monoxide is reacted with oxygen at a temperature lower than the light-off temperature of a three-way catalyst not containing any substance having an electron donatability; whereby, part of the exhaust gas is purified; the heat generated by the above reaction increases the temperatures of said catalyst and its surroundings; and the hydrocarbons, nitrogen oxides and carbon monoxide contained in the exhaust gas are purified.

25. A system for exhaust gas purification according to claim 22, wherein the catalyst layer of said catalyst comprises a layer containing a precious metal and a layer containing a substance having at least one of an electron donatability and a nitrogen dioxide absorbability and releasability, with the individual layers being supported on one same carrier in a pile-up state.

26. A system for exhaust gas purification according to claim 22, wherein the precious metal and the substance having at least one of an electron donatability and a nitrogen dioxide absorbability and releasability are present in a mixed state in the catalyst layer of the catalyst.

27. A system for exhaust gas purification according to claim 22, wherein the precious metal is at least one of Pt, Pd and Rh.

28. A system for exhaust gas purification according to claim 22, wherein the precious metal is at least one of Pt and Pd.

29. A system for exhaust gas purification according to claim 22, wherein said adsorbent is disposed upstream of said catalyst in the flow path of exhaust gas.

30. A system for exhaust gas purification according to claim 22, wherein said adsorbent and said catalyst are formed in one monolithic carrier and the adsorbent is disposed at the upstream side of the carrier and the catalyst is disposed at the downstream side of the carrier in the flow path of exhaust gas.

31. A system for exhaust gas purification according to claim 22, wherein another catalyst for exhaust gas purification is disposed downstream of said adsorbent and said catalyst in the flow path of exhaust gas.

32. A system for exhaust gas purification according to claim 22, wherein another catalyst for exhaust gas purification is disposed upstream of said adsorbent and said catalyst in the flow path of exhaust gas.

33. A system for exhaust gas purification according to claim 22, wherein the substance having at least one of an electron donatability and a nitrogen dioxide absorbability and releasability is at least one element selected from the group consisting of alkali metals, alkaline earth metals, rare earth elements, transition metals and actinide elements; an oxide thereof; or a compound oxide containing at least one of said elements.

34. A system for exhaust gas purification according to claim 33, wherein the at least one element is selected from the group consisting of Li, Cs, Mg, Ca, Sr, Ba, Y, Ti, Zr, Hf, La, Ce, Pr, Nd, Th and U.

35. A system for exhaust gas purification according to claim 33, wherein the at least one element is selected from the group consisting of Cs, Mg, Sr, Ba, Y, Zr, Hf, La, Ce and Th.

36. A system for exhaust gas purification according to claim 22, wherein the adsorbent layer of said adsorbent comprises a catalyst component.

37. A system for exhaust gas purification according to claim 36, wherein the adsorbent layer containing a catalyst component contains a precious metal and a substance having at least one of an electron donatability and a nitrogen dioxide absorbability and releasability.

38. A system for exhaust gas purification according to claim 36, wherein the adsorbent layer containing a catalyst component comprises a rare earth element oxide.

39. A system for exhaust gas purification according to claim 22, wherein a layer containing a catalyst component is formed on the surface of the adsorbent layer of said adsorbent or between the adsorbent layer and the carrier.

40. A system for exhaust gas purification according to claim 39, wherein the layer containing a catalyst component contains a precious metal and a substance having at least one of an electron donatability and a nitrogen dioxide absorbability and releasability.

41. A system for exhaust gas purification according to claim 39, wherein the layer containing a catalyst component comprises a rare earth element oxide.

42. A system for exhaust gas purification according to claim 22, wherein the adsorbent layer of said adsorbent comprises zeolite.

43. A system for exhaust gas purification according to claim 42, wherein the zeolite has a $SiO_2/Al_2O_3$ molar ratio of 40 or more.

44. A system for exhaust gas purification according to claim 42, wherein the zeolite contains at least one precious metal selected from the group consisting of Pt, Pd and Rh.

45. A system for exhaust gas purification according to claim 42, wherein the zeolite contains at least one of the ions of group IB elements (Cu, Ag and Au) of the periodic table.

46. A system for exhaust gas purification according to claim 22, wherein the carrier of said catalyst giving an excellent light-off performance at low temperatures is a monolithic carrier.

47. A system for exhaust gas purification according to claim 46, wherein the catalyst layer of said catalyst comprises a layer containing a precious metal and a layer containing a substance having at least one of an electron donatability and a nitrogen dioxide absorbability and releasability, with the individual layers being supported on different monolithic carriers.

48. A system for exhaust gas purification according to claim 46, wherein the catalyst layer of said catalyst comprises a layer containing a precious metal and a layer containing a substance having at least one of an electron donatability and a nitrogen dioxide absorbability and releasability, with the individual layers being supported on one same monolithic carrier apart in the flow direction of exhaust gas.

49. A system for exhaust gas purification according to claim 46, wherein the precious metal is supported in an amount of 10–700 $g/ft^3$.

50. A system for exhaust gas purification according to claim 22, wherein the carrier of said adsorbent is a monolithic carrier.

51. A system for exhaust gas purification according to claim 50, wherein a blowing-through portion is formed in the monolithic carrier so as to allow the blowing of exhaust gas through the portion.

52. A system for exhaust gas purification according to claim 51, wherein the blowing-through portion is formed parallel to the passages of the monolithic carrier.

53. A system for exhaust gas purification disposed in an exhaust pipe of an internal combustion engine, comprising:
a catalyst giving an excellent light-off performance at low temperatures, comprising a carrier and a catalyst layer supported thereon, the catalyst layer comprising a precious metal and a substance having at least one of an electron donatability and a nitrogen dioxide absorbability and releasability, and
optionally an adsorbent-catalyst comprising a monolithic carrier, an adsorbent layer having a hydrocarbon adsorbability and a catalyst layer having at least one of a three-way catalytic activity and an oxidizing ability, the adsorbent layer and the catalyst layer being separately supported on the monolithic carrier in at least part of the cross sections of the adsorbent-catalyst perpendicular to the flow direction of exhaust gas.

54. A system for exhaust gas purification according to claim 53, wherein the combustible components contained in an exhaust gas to be purified are reacted with nitrogen dioxide in the presence of said catalyst giving an excellent light-off performance at low temperatures, at a temperature lower than the light-off temperature of the oxidation reaction between said combustible components and oxygen; whereby, part of the exhaust gas is purified; the heat generated by the above reaction increases the temperatures of said catalyst and its surroundings; and the hydrocarbons, nitrogen oxides and carbon monoxide contained in the exhaust gas are purified.

55. A system for exhaust gas purification according to claim 53, wherein the substance having an electron donatability, present in said catalyst giving an excellent light-off performance at low temperatures supplies electrons to the precious metal also present in said catalyst; whereby, the adsorbability of the precious metal for at least one of the hydrocarbons and carbon monoxide is reacted with oxygen at a temperature lower than the light-off temperature of a three-way catalyst not containing any substance having an electron donatability; whereby, part of the exhaust gas is purified; the heat generated by the above reaction increases the temperatures of said catalyst and its surroundings; and the hydrocarbons, nitrogen oxides and carbon monoxide contained in the exhaust gas are purified.

56. A system for exhaust gas purification according to claim 53, wherein the catalyst layer of said catalyst comprises a layer containing a precious metal and a layer containing a substance having at least one of an electron donatability and a nitrogen dioxide absorbability and releasability, with the individual layers being supported on one same carrier in a pile-up state.

57. A system for exhaust gas purification according to claim 53, wherein the precious metal and the substance having at least one of an electron donatability and a nitrogen dioxide absorbability and releasability are present in a mixed state in the catalyst layer of the catalyst.

58. A system for exhaust gas purification according to claim 53, wherein the precious metal is at least one of Pt, Pd and Rh.

59. A system for exhaust gas purification according to claims 53, wherein the precious metal is at least one of Pt and Pd.

60. A system for exhaust gas purification according to claim 53, wherein the adsorbent layer of said adsorbent-catalyst comprises zeolite.

61. A system for exhaust gas purification according to claim 60, wherein the zeolite has a $SiO_2/Al_2O_3$ molar ratio of 40 or more.

62. A system for exhaust gas purification according to claim 60, wherein the zeolite contains at least one precious metal selected from the group consisting of Pt, Pd and Rh.

63. A system for exhaust gas purification according to claim 60, wherein the zeolite contains at least one of the ions of group IB elements (Cu, Ag and Au) of the periodic table.

64. A system for exhaust gas purification according to claim 53, wherein said adsorbent-catalyst is disposed upstream of said catalyst in the flow path of exhaust gas.

65. A system for exhaust gas purification according to claim 53, wherein said adsorbent-catalyst and said catalyst are formed in one monolithic carrier and the adsorbent-catalyst is disposed at the upstream side of the carrier and the catalyst is disposed at the downstream side of the carrier in the flow path of exhaust gas.

66. A system for exhaust gas purification according to claim 53, wherein another catalyst for exhaust gas purification is disposed downstream of said adsorbent-catalyst and said catalyst in the flow path of exhaust gas.

67. A system for exhaust gas purification according to claim 53, wherein another catalyst for exhaust gas purification is disposed upstream of said adsorbent-catalyst and said catalyst in the flow path of exhaust gas.

68. A system for exhaust gas purification according to claim 53, wherein the substance having at least one of an electron donatability and a nitrogen dioxide absorbability and releasability is at least one element selected from the group consisting of alkali metals, alkaline earth metals, rare earth elements, transition metals and actinide elements; an oxide thereof; or a compound oxide containing at least one element mentioned above.

69. A system for exhaust gas purification according to claim 68, wherein the at least one element is selected from the group consisting of Li, Cs, Mg, Ca, Sr, Ba, Y, Ti, Zr, Hf, La, Ce, Pr, Nd, Th and U.

70. A system for exhaust gas purification according to claim 68, wherein the at least one element is selected from the group consisting of Cs, Mg, Sr, Ba, Y, Zr, Hf, La, Ce and Th.

71. A system for exhaust gas purification according to claim 53, wherein the adsorbent layer of said adsorbent-catalyst comprises a catalyst component.

72. A system for exhaust gas purification according to claim 71, wherein the adsorbent layer containing a catalyst component comprises a precious metal and a substance having at least one of an electron donatability and a nitrogen dioxide absorbability and releasability.

73. A system for exhaust gas purification according to claim 71, wherein the adsorbent layer containing a catalyst component contains a rare earth element oxide.

74. A system for exhaust gas purification according to claim 53, wherein a layer containing a catalyst component is formed on at least one of the surface of the adsorbent layer of said adsorbent-catalyst and between the adsorbent layer and the carrier.

75. A system for exhaust gas purification according to claim 74, wherein the layer containing a catalyst component contains a precious metal and a substance having at least one of an electron donatability and a nitrogen dioxide absorbability and releasability.

76. A system for exhaust gas purification according to claim 74, wherein the layer containing a catalyst component comprises a rare earth element oxide.

77. A system for exhaust gas purification according to claim 53, wherein the carrier of said catalyst giving an excellent light-off performance at low temperatures is a monolithic carrier.

78. A system for exhaust gas purification according to claim 77, wherein the catalyst layer of said catalyst comprises a layer containing a precious metal and a layer containing a substance having at least one of an electron donatability and a nitrogen dioxide absorbability and releasability, with the individual layers being supported on different monolithic carriers.

79. A system for exhaust gas purification according to claim 77, wherein the catalyst layer of said catalyst comprises a layer containing a precious metal and a layer containing a substance having at least one of an electron donatability and a nitrogen dioxide absorbability and releasability, with the individual layers being supported on one same monolithic carrier apart in the flow direction of exhaust gas.

80. A system for exhaust gas purification according to claim 77, wherein the precious metal is supported in an amount of 10–700 g/ft$^3$.

81. A method for exhaust gas purification using the system for exhaust gas purification according to claim 1, 22 or 53, comprising at least one of adding an oxidizing gas to an exhaust gas to be purified and controlling the amounts of air and fuel fed into the engine so that the oxygen amount in the exhaust gas is increased, for a certain length of time during engine cold start.

* * * * *